United States Patent
Dateki et al.

(10) Patent No.: US 8,711,972 B2
(45) Date of Patent: Apr. 29, 2014

(54) RADIO COMMUNICATION SYSTEM, TRANSMISSION APPARATUS, RECEPTION APPARATUS, AND RADIO COMMUNICATION METHOD IN RADIO COMMUNICATION

(75) Inventors: Takashi Dateki, Kawasaki (JP); Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 13/237,466

(22) Filed: Sep. 20, 2011

(65) Prior Publication Data
US 2012/0008700 A1  Jan. 12, 2012

Related U.S. Application Data

(63) Continuation of application No. PCT/JP2009/001444, filed on Mar. 30, 2009.

(51) Int. Cl.
*H04L 27/00* (2006.01)
*H04L 23/00* (2006.01)

(52) U.S. Cl.
USPC .......................................... 375/295; 375/377

(58) Field of Classification Search
CPC ..... H04L 5/001; H04L 27/2614; H04L 5/003; H04L 1/08; H04L 2025/03414; H04L 27/2626; H04L 1/0007; H04L 1/0041; H04L 27/2623; H04L 5/0044; H04W 5/0044; H04W 72/04; H04W 72/1268
USPC .......... 375/259, 260, 295, 377; 370/203, 208, 370/210; 455/17, 522
See application file for complete search history.

(56) References Cited

U.S. PATENT DOCUMENTS

| | | | | |
|---|---|---|---|---|
| 7,028,246 B2 * | 4/2006 | Kim et al. | ...... | 714/784 |
| 8,526,529 B2 * | 9/2013 | Ahn et al. | ...... | 375/295 |
| 2005/0157803 A1 * | 7/2005 | Kim et al. | ...... | 375/260 |
| 2005/0160347 A1 * | 7/2005 | Kim et al. | ...... | 714/776 |
| 2007/0041404 A1 | 2/2007 | Palanki et al. | | |
| 2007/0253498 A1 * | 11/2007 | Matsumoto et al. | ...... | 375/260 |
| 2008/0304584 A1 | 12/2008 | Nishio et al. | | |
| 2013/0039398 A1 * | 2/2013 | Ko et al. | ...... | 375/219 |

FOREIGN PATENT DOCUMENTS

| | | |
|---|---|---|
| CN | 1993912 | 7/2007 |
| JP | 2009-505504 | 2/2009 |
| WO | 2006/011524 | 2/2006 |

OTHER PUBLICATIONS

Ericsson; "DFT size for uplink transmissions"; TSG-RAN WG1 #47, Riga, Latvia, Nov. 6-10, 2006; R1-063127.
LG Electronics; "Uplink multiple access schemes for LTE-A" 3GPP TSG RAN WG1 #54, Jeju, Korea, Aug. 18-22, 2008; R1-082945.

(Continued)

*Primary Examiner* — Tesfaldet Bocure
(74) *Attorney, Agent, or Firm* — Myers Wolin, LLC

(57) ABSTRACT

A radio communication system, including: a transmission apparatus; and a reception apparatus, wherein the transmission apparatus and reception apparatus performs a radio communication, the transmission apparatus includes: one or more processor configured to enlarge a sequence length of a transmission data by repeating a sequence of the transmission data, and to perform a first subcarrier arrangement to arrange each of components included in the enlarged transmission data to each of subcarrier according to positions of the each of components in the enlarged transmission data, and to puncture the component of the arranged transmission data, when the subcarrier is not used for transmission; and a transmitter which transmits the transmission data arranged on the subcarrier to the reception apparatus, and the reception apparatus includes a receiver which receives the transmission data.

7 Claims, 22 Drawing Sheets

(56) References Cited

OTHER PUBLICATIONS

3GPP TS 36.211 V8.3.0; (May 2008); 3rd Generation Partnership Project; Technical Specification Group Radio Access Network; "Evolved Universal Terrestrial Radio Access (E-UTRA)"; Physical Channels and Modulation (Release 8); May 2008.

International Search Report issued for corresponding International Patent Application No. PCT/JP2009/001444, mailed Jun. 2, 2009.

First Notification of Office Action issued for corresponding Chinese Patent Application No. 200980158553.7 issued on Oct. 25, 2013 with English translation.

* cited by examiner

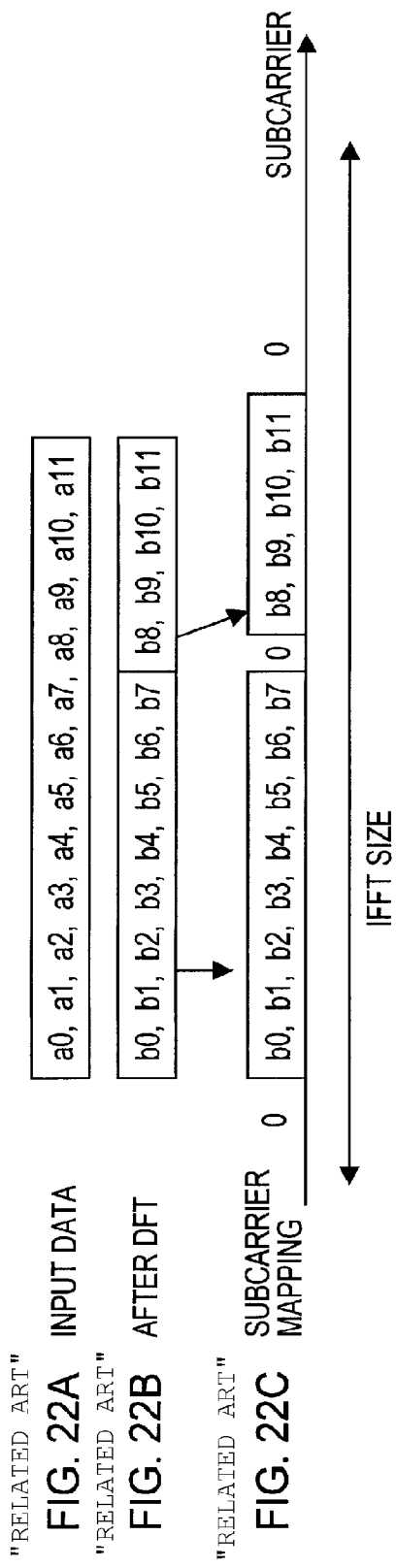
"RELATED ART" FIG. 22A INPUT DATA
"RELATED ART" FIG. 22B AFTER DFT
"RELATED ART" FIG. 22C SUBCARRIER MAPPING

RADIO COMMUNICATION SYSTEM, TRANSMISSION APPARATUS, RECEPTION APPARATUS, AND RADIO COMMUNICATION METHOD IN RADIO COMMUNICATION

CROSS-REFERENCE TO RELATED APPLICATIONS

This application is a continuation of International Application No. PCT/JP2009/1444, filed on Mar. 30, 2009, now pending, the contents of which are herein wholly incorporated by reference.

TECHNICAL FIELD

The embodiments discussed herein are related to a radio communication system, a transmission apparatus, a reception apparatus, and a radio communication method in a radio communication system.

BACKGROUND ART

In 3GPP LTE (3rd Generation Partnership Project Long Term Evolution), SC-FDMA (Single Carrier-Frequency Division Multiples Access) is used in an uplink direction (for example, Non-Patent Document 1 as below). SC-FDMA is lower in PAPR (Peak to Average Power Ratio) than a multi-carrier communication scheme such as OFDM or the like. Consequently, a communication scheme using SC-FDMA can achieve a low cost and a low power consumption of a transmission amplifier of a terminal apparatus as compared with those in the multi-carrier communication scheme.

In addition, there is proposed a technology called Clustered SC-FDMA (for example, Non-Patent Document 2 as below). In Clustered SC-FDMA, for example, data sequences after DFT are divided into a plurality of clusters, and the divided sequences are arranged on each subcarrier group. FIGS. 22A to 22C illustrate examples of subcarrier arrangement using Clustered SC-FDMA. The example illustrated in each of the drawings is an example in which, among twelve subcarriers, "b0" to "b7" are arranged in a cluster 1, and "b8" to "b11" are arranged in a cluster 2. Since Clustered SC-FDMA is capable of performing a communication by using a plurality of discontinuous subcarrier groups, Clustered SC-FDMA is effective in the case where a communication is performed using a transmission band wider than that of LTE such as, for example, the case of LTE-A (LTE-Advanced) or the like.

Non-Patent Document 1: 3GPP TS36.211 V8.3.0
Non-Patent Document 2: 3GPP R1-082945, "Uplink multipleaccess schemes for LTE-A", LG Electronics

DISCLOSURE OF THE INVENTION

Problems to be Solved by the Invention

However, in Clustered SC-FDMA, among the data sequences after DFT, a part of components (for example, "b8" to "b11" in the example of FIG. 22C) is arranged on subcarriers of which states are different from those before cluster division. When conversion into a signal in a time domain is performed with such subcarrier arrangement, after the conversion is completed, the states thereof are not returned to those before the cluster conversion, and a transmission waveform thereof changes as in the case of multi-carrier transmission.

The multi-carrier transmission has a transmission signal waveform in which a plurality of waveforms transmitting separate data items are superimposed on each other, and has large PAPR as compared with that of single-carrier transmission which has a transmission signal waveform which is interpolated using a waveform of a given amplitude.

Consequently, in Clustered SC-FDMA, PAPR characteristics are degraded as compared with the single-carrier transmission such as SC-FDMA or the like.

Accordingly, it is an object in one aspect of the invention to provide a radio communication system, a transmission apparatus, a reception apparatus, and a radio communication method in a radio communication system in which PAPR characteristics are improved.

Means for Solving the Problem

According to an aspect of the invention, a radio communication system, including: a transmission apparatus; and a reception apparatus, wherein the transmission apparatus and reception apparatus performs a radio communication, the transmission apparatus includes: one or more processor configured to enlarge a sequence length of a transmission data by repeating a sequence of the transmission data, and to perform a first subcarrier arrangement to arrange each of components included in the enlarged transmission data to each of subcarrier according to positions of the each of components in the enlarged transmission data, and to puncture the component of the arranged transmission data, when the subcarrier is not used for transmission; and a transmitter which transmits the transmission data arranged on the subcarrier to the reception apparatus, and the reception apparatus includes a receiver which receives the transmission data.

Furthermore, according to an aspect of the invention, a radio communication system, including: a transmission apparatus; and a reception apparatus, wherein the transmission apparatus and the reception apparatus performs a radio communication, the transmission apparatus includes: one or more processors configured to perform a first subcarrier arrangement to arrange each of components included in a transmission data, converted into a transmission data in a frequency domain at a size equal to a number of subcarriers allocated to the transmission apparatus, to each of the subcarriers according to positions of the each of components in the converted transmission data, and to puncture the component of the transmission data arranged on the subcarrier, when the subcarrier is not used for transmission; and a transmitter which transmits the arranged transmission data converted into a transmission data in a time domain, to the reception apparatus, and the reception apparatus includes a receiver which receives the transmission data.

Furthermore, according to an aspect of the invention, a transmission apparatus for performing a radio communication with a reception apparatus, the apparatus including: one or more processors configured to enlarge a sequence length of a transmission data by repeating a sequence of the transmission data, and to perform subcarrier arrangement to arrange each of components included in the enlarged transmission data to each of subcarriers according to positions of the each of components in the enlarged transmission data, and to puncture the component of the transmission data arranged to the subcarrier, when the subcarrier is not used for transmission; and a transmitter which transmits the arranged transmission data to the reception apparatus.

Furthermore, according to an aspect of the invention, a transmission apparatus for performing a radio communication with a reception apparatus, the apparatus including: one or more processors configured to perform a subcarrier arrangement to arrange each of components included in a transmission data, converted into the transmission data in a frequency domain at a size equal to the number of subcarriers allocated to the transmission apparatus, to each of the subcarriers according to positions of the each of components in the converted transmission data, and to puncture the component of the arranged transmission data on the subcarrier, when the subcarrier is not used for transmission; a transmitter which transmits the arranged transmission data converted into a transmission data in a time domain to the reception apparatus.

Furthermore, according to an aspect of the invention, a reception apparatus for performing a radio communication with a transmission apparatus, the apparatus including: a receiver which receives transmission data arranged to subcarrier, and obtained by enlarging a sequence length of the transmission data by repeating a sequence of the transmission data, arranging each of components included in the enlarged transmission data to each of subcarriers according to positions of the each of components in the enlarged transmission data, and puncturing the component of the arranged transmission data when the subcarrier is not used for transmission.

Furthermore, according to an aspect of the invention, a reception apparatus for performing a radio communication with a transmission apparatus, the apparatus including: a receiver which receives a transmission data in a time domain obtained by converting a transmission data into a transmission data in a frequency domain at a size equal to number of subcarriers allocated to the transmission apparatus, arranging each of components included in the transmission data converted into the transmission data in the frequency domain to each of the subcarriers according to positions of the each of components in the converted transmission data, puncturing the component of the arranged transmission data when the subcarrier is not used for transmission, and converting the arranged transmission data into the transmission data in the time domain.

Furthermore, according to an aspect of the invention, a radio communication method in a radio communication system for performing a radio communication between a transmission apparatus and a reception apparatus, the method including: enlarging a sequence length of a transmission data by repeating a sequence of the transmission data, arranging each of components included in the enlarged transmission data to each of subcarriers according to the positions of the each of components in the enlarged transmission data, and puncturing the component of the arranged transmission when the subcarrier is not used for transmission, by the transmission apparatus; transmitting the arranged transmission data to the reception apparatus, by the transmission apparatus; and receiving the transmission data, by the reception apparatus.

Furthermore, according to an aspect of the invention, a radio communication method in a radio communication system for performing a radio communication between a transmission apparatus and a reception apparatus, the method including: converting a transmission data into a transmission data in a frequency domain at a size equal to number of subcarriers allocated to the transmission apparatus, by the transmission apparatus; arranging each of components included in the transmission data converted into the transmission data in the frequency domain to each of the subcarriers according to positions of the each of components in the converted transmission data, and puncturing the component of the arranged transmission data when the subcarrier is not used for transmission, by the transmission apparatus; converting the arranged transmission data into a transmission data in a time domain, and transmitting the converted transmission data to the reception apparatus, by the transmission apparatus; and receiving the transmission data, by the reception apparatus.

Effectiveness of the Invention

There can be provided a radio communication system, a transmission apparatus, a reception apparatus, and a radio communication method in a radio communication system in which PAPR characteristics are improved.

BRIEF DESCRIPTION OF THE DRAWINGS

FIGS. 5A to 5D illustrate examples of arrangement onto subcarriers and the like;

FIGS. 7A to 7C illustrate examples of the arrangement onto subcarriers and the like;

FIGS. 10A to 10E illustrate examples of the arrangement onto subcarriers and the like;

FIGS. 14A to 14C illustrate examples of the arrangement onto subcarriers and the like;

FIGS. 22A to 22C illustrate examples of conventional arrangement onto subcarriers and the like.

BEST MODE FOR CARRYING OUT THE INVENTION

A description is given hereinbelow of modes for carrying out the present invention.

First Embodiment

Figure 1:
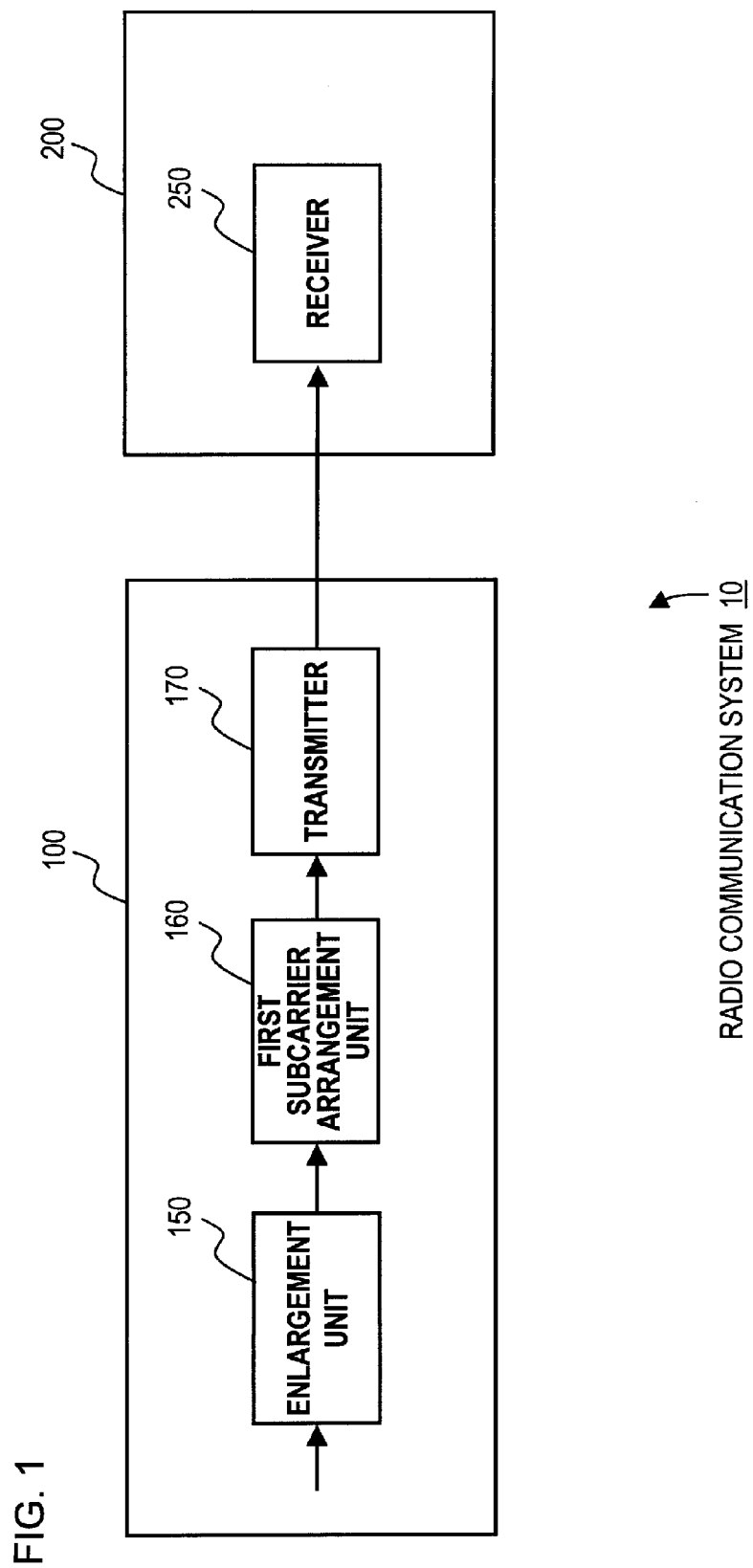
FIG. 1 illustrates an example of a configuration of a radio communication system.

A first embodiment is described. FIG. 1 illustrates an example of a configuration of a radio communication system 10. In the radio communication system in which a radio communication is performed between a transmission apparatus 100 and a reception apparatus 200, the transmission apparatus 100 includes an enlargement unit 150 which enlarges a sequence length of a transmission data by repeating a sequence of the transmission data, first subcarrier arrangement unit 160 which arranges each of components included in the enlarged transmission data on each of subcarriers, while maintaining a positional relationship between the each of components, and punctures the component of the transmission data arranged on the subcarrier, when the subcarrier is not used for transmission, and a transmitter 170 which transmits the transmission data arranged on the subcarriers to the reception apparatus 200, and the reception apparatus 200 includes a receiver 250 which receives the transmission data. The each of the functions of the enlargement unit 150 and the first subcarrier arrangement unit 160 may be realized by a processor such as Digital Signal Processor (DSP), Field Programmable Gate Allay (FPGA), Central Processing Unit (CPU) etc.

The enlargement unit 150 repeats the transmission data sequence of inputted transmission data to enlarge the sequence length of the transmission data.

The enlarged transmission data is inputted to the first subcarrier arrangement unit 160, and the first subcarrier arrangement unit 160 arranges, while maintaining the positional relationship between individual components included in the transmission data, each of the components on each of subcarriers. At this point, the first subcarrier arrangement unit 160 punctures the component of the transmission data to be arranged on the subcarrier not used for transmission.

The transmitter 170 transmits the transmission data arranged on the subcarriers by the first subcarrier arrangement unit 160 to the reception apparatus.

The receiver 250 of the reception apparatus 200 receives the transmission data transmitted from the transmitter 170.

In the radio communication system 10, the transmission data sequence is repeated to be enlarged by the enlargement unit 150, and the enlarged transmission data sequences are arranged on the subcarriers by the first subcarrier arrangement unit 160 while the positional relationship between the enlarged transmission data sequences is maintained.

Consequently, the probability that the components of the transmission data sequences arranged on the subcarriers are arranged on the subcarriers which do not conform to the positional relationship between the transmission data sequences before being inputted to the enlargement unit 150 is reduced as compared with the case of Clustered SC-OFDM. Therefore, PAPR characteristics in the present radio system 10 are improved as compared with those of Clustered SC-OFDM.

Second Embodiment

Figure 2:
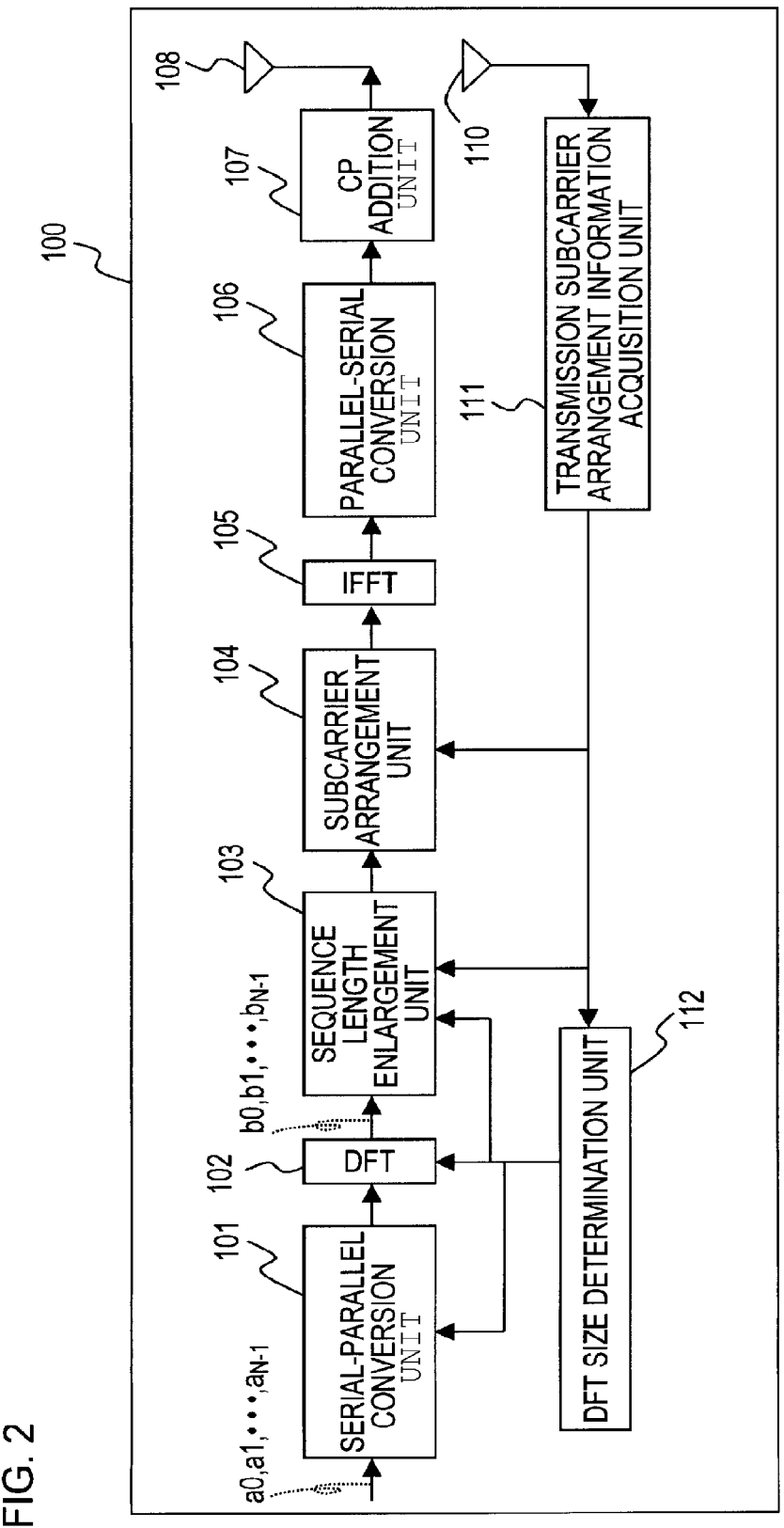
FIG. 2 illustrates an example of a configuration of a transmission apparatus.
Figure 3:
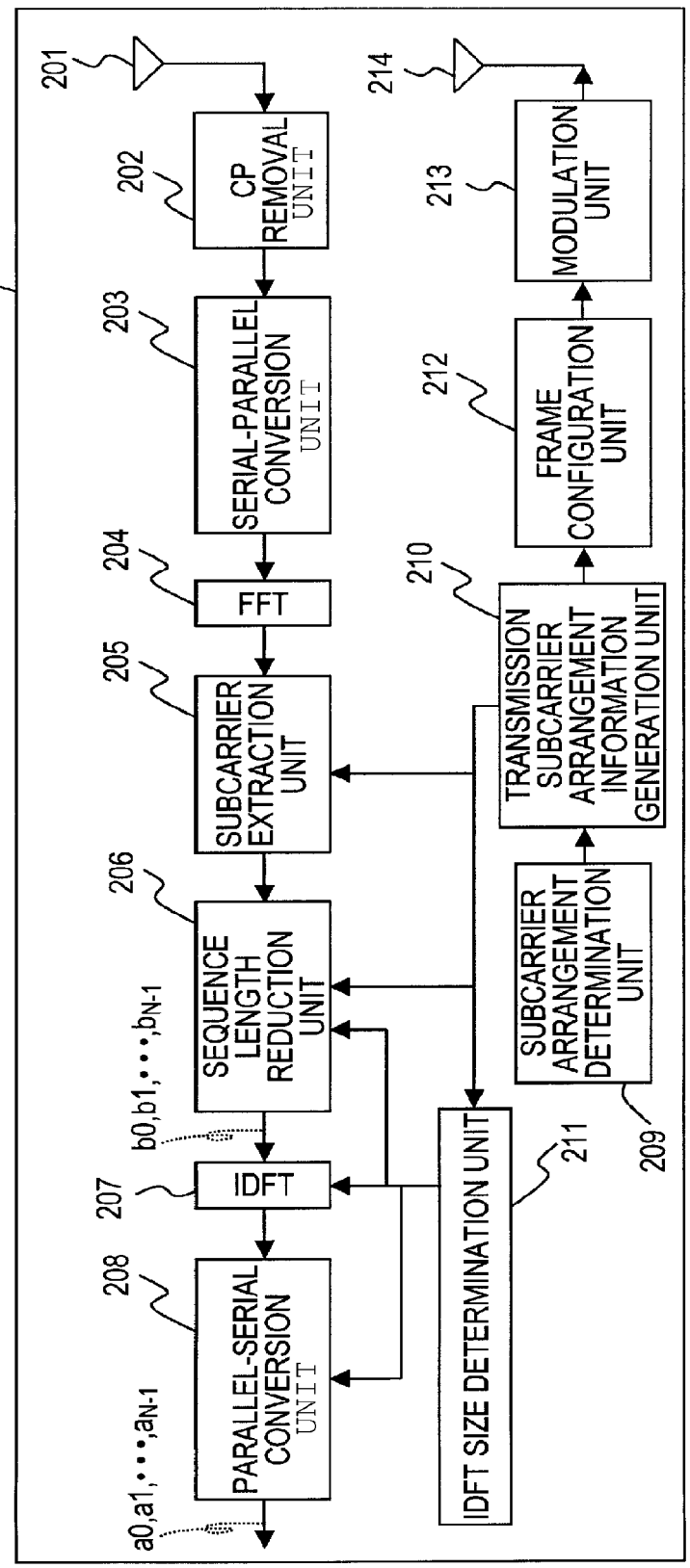
FIG. 3 illustrates an example of a configuration of a reception apparatus.

Next, a second embodiment is described. FIG. 2 illustrates an example of a configuration of the transmission apparatus 100 in the radio communication system 10, while FIG. 3 illustrates an example of a configuration of the reception apparatus 200 in the radio communication system 10. In the second embodiment, for example, the transmission apparatus 100 corresponds to a terminal apparatus, while the reception apparatus 200 corresponds to a base station apparatus, and data or the like is transmitted from the transmission apparatus 100 to the reception apparatus 200 in an uplink direction.

The transmission apparatus 100 includes a serial-parallel conversion unit 101, a DFT (discrete Fourier Transform) unit 102, a sequence length enlargement unit 103, a subcarrier arrangement unit 104, an IFFT (Inverse Fast Fourier Transform) unit 105, a parallel-serial conversion unit 106, a CP (Cyclic Prefix) addition unit 107, a transmission antenna 108, a reception antenna 110, a transmission subcarrier arrangement information acquisition unit 111, and a DFT size determination unit 112.

The enlargement unit 150 in the first embodiment corresponds to, for example, the sequence length enlargement unit 103, the first subcarrier arrangement unit 160 therein corresponds to, for example, the subcarrier arrangement unit 104, and the transmitter 170 therein corresponds to, for example, a portion from the IFFT unit 105 to the transmission antenna 110.

The serial-parallel conversion unit 101 converts data in a serial format $a0, a1, \ldots, a_{N-1}$ into data in a parallel format.

The DFT unit 102 performs DFT processing on the data after the parallel conversion to convert data in a time domain into data in a frequency domain $b0, b1, \ldots, b_{N-1}$.

The sequence length enlargement unit 103 repeats the data after the DFT processing based on a DFT size and subcarrier arrangement information to enlarge the sequence length (or a data length) of the data. The details thereof are described later.

The subcarrier arrangement unit 104 arranges the data after the enlargement on subcarriers in accordance with transmission subcarrier arrangement information. The details thereof are described later.

The IFFT unit 105 performs IFFT processing on an output of the subcarrier arrangement unit 104 to convert the data in the frequency domain into the data in the time domain.

The parallel-serial conversion unit 106 converts the format of an output of the IFFT unit 105 into the serial format.

The CP addition unit 107 adds CP to the data after the serial conversion, and outputs the data.

The transmission antenna 108 transmits the output of the CP addition unit 107 to the reception apparatus 200 as a radio signal.

The reception antenna 110 receives a radio signal transmitted from the reception apparatus 200.

The transmission subcarrier arrangement information acquisition unit 111 performs demodulation and the like on the radio signal received in the reception antenna 110, and acquires the transmission subcarrier arrangement information from the radio signal subjected to the demodulation and the like. The transmission subcarrier arrangement information acquisition unit 111 outputs the acquired transmission subcarrier arrangement information to the DFT size determination unit 112, the sequence length enlargement unit 103, and the subcarrier arrangement unit 104.

The DFT size determination unit 112 determines the DFT size based on the transmission subcarrier arrangement information, and outputs the DFT size to the serial-parallel conversion unit 101, the DFT unit 102, and the sequence length enlargement unit 103. The DFT unit 102 and the like perform the DFT processing and the like at the determined DFT size.

The reception apparatus 200 includes a reception antenna 201, a CP removal unit 202, a serial-parallel conversion unit 203, an FFT (Fast Fourier Transform) unit 204, a subcarrier extraction unit 205, a sequence length reduction unit 206, an IDFT (Inverse Discrete Fourier Transform) unit 207, a parallel-serial conversion unit 208, a subcarrier arrangement determination unit 209, a transmission subcarrier arrangement information generation unit 210, an IDFT size determination unit 211, a frame configuration unit 212, a modulation unit 213, and a transmission antenna 214.

The receiver 250 in the first embodiment corresponds to, for example, a portion from the reception antenna 201 to the parallel-serial conversion unit 208, and the IDFT size determination unit 211.

The reception antenna 201 receives the radio signal transmitted from the transmission apparatus 100, and converts the radio signal into the data before being subjected to the conversion into the radio signal in the transmission apparatus 100.

The CP removal unit 202 removes CP from the data from the reception antenna 201.

The serial-parallel conversion unit 203 converts the data from which CP is removed into data in the parallel format.

The FFT unit 204 performs FFT processing on the data after the conversion into the parallel format to convert the data in the time domain into the data in the frequency domain.

The subcarrier extraction unit 205 extracts the data arranged on the subcarriers from an output of the FFT unit 204 in accordance with the subcarrier arrangement information.

The sequence length reduction unit 206 reduces the data enlarged by the sequence length enlargement unit 103 of the transmission apparatus 100 in accordance with the transmission subcarrier arrangement information and an IDFT size.

The IDFT unit 207 performs IDFT processing on data b0, b1, ..., $b_{N-1}$ outputted from the sequence length reduction unit 206 to convert the data into the data in the time domain.

The parallel-serial conversion unit 208 converts the data after the IDFT processing into the data in the serial format, and outputs the data.

The subcarrier arrangement determination unit 209 determines which subcarrier the data transmitted from the transmission apparatus 100 is to be arranged on, and the like.

The transmission subcarrier arrangement information generation unit 210 generates the transmission subcarrier arrangement information indicating which subcarrier is to be used when the transmission apparatus 100 transmits the data, and the like base on the subcarrier arrangement determined by the subcarrier arrangement determination unit 209 and the like.

The IDFT size determination unit 211 determines the IDFT size based on the transmission subcarrier arrangement information, and outputs the determined IDFT size to the sequence length reduction unit 206, the IDFT unit 207, and the parallel-serial conversion unit 208. The IDFT unit 207 and the like perform processing such as IDFT and the like based on the IDFT size.

The frame configuration unit 212 generates a frame such that the transmission subcarrier arrangement information is contained in the frame.

The modulation unit 213 modulates an output from the frame configuration unit 212.

The transmission antenna 214 converts an output from the modulation unit 213 into the radio signal, and transmits the radio signal to the transmission apparatus 100. The reception apparatus 200 transmits the transmission subcarrier arrangement information to the transmission apparatus 100.

Figure 4:
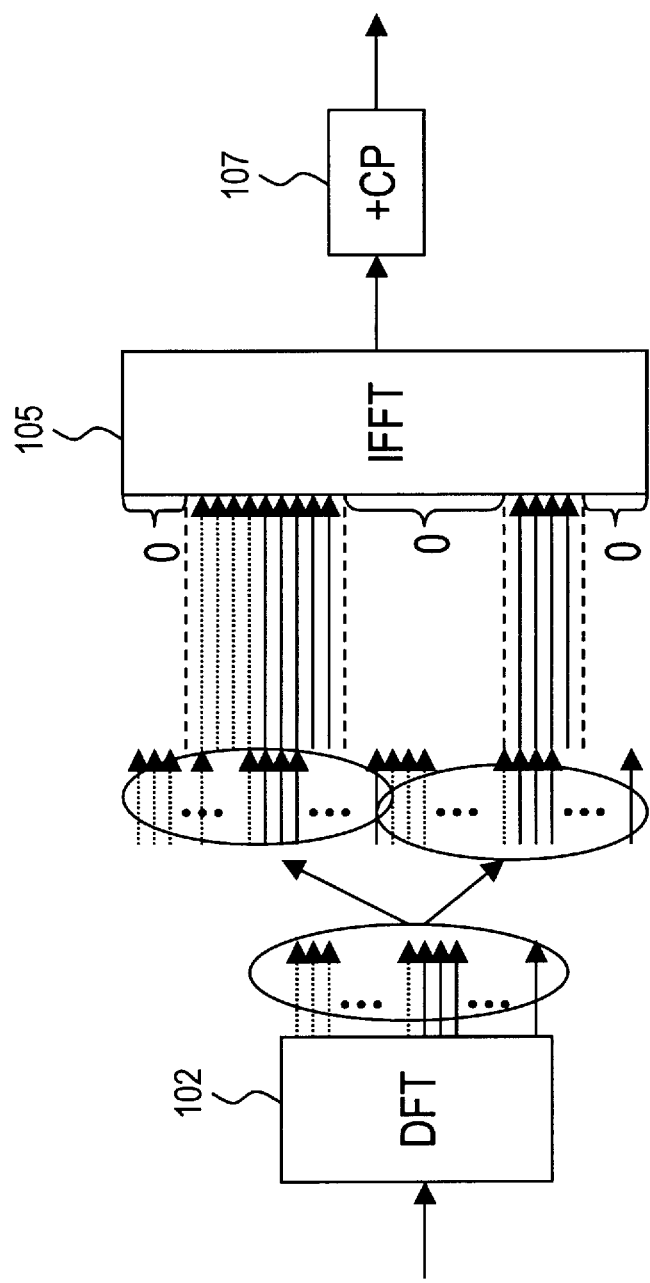
FIG. 4 illustrates an example of an operation.

Next, a description is given of an example of processing performed in the sequence length enlargement unit 103 and the subcarrier arrangement unit 104 of the transmission apparatus 100. FIG. 4 illustrates an example of processing of arrangement onto the subcarriers, while FIGS. 5A to 5D illustrate examples of the arrangement onto the subcarriers.

The DFT processing is performed on twelve input data sequences a0, a1, ..., a11 in the DFT unit 102, and data sequences after DFT b0, b1, ..., b11 are obtained. Since one resource block includes twelve subcarriers, in the example of FIG. 5A or the like, a description is given by taking twelve sequences as an example. It will be easily understood that the number of sequences may be other numbers.

The sequence length enlargement unit 103 enlarges the data sequences after DFT b0, b1, ..., b11 by repeating to output the data sequences b0, b1, ..., b11, b0, b1, .... The sequence length enlargement unit 103 performs the repeating such that the number of data sequences is not less than the number of subcarriers from the subcarrier having the lowest subcarrier frequency to the subcarrier having the highest subcarrier frequency among a plurality of subcarriers used for transmission. The transmission subcarrier arrangement information includes the highest subcarrier frequency, the lowest subcarrier frequency, or the number of subcarriers used for transmission. The sequence length enlargement unit 103 can determine the number of time of the repeating (or the number of time of the enlargement) based on the transmission subcarrier arrangement information.

Figure 5:
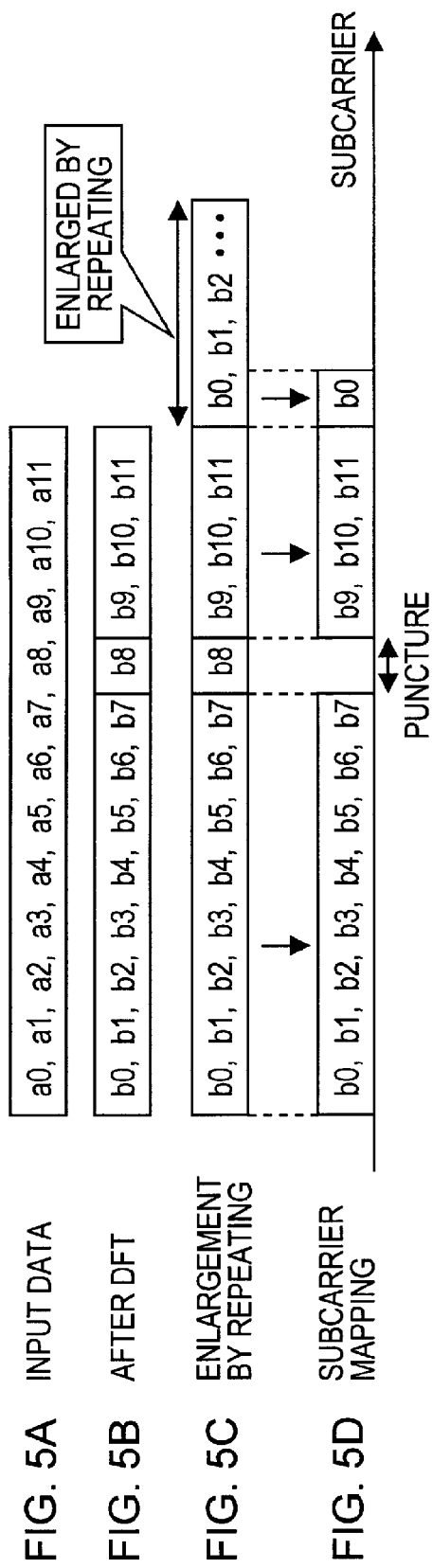
Figure 6:
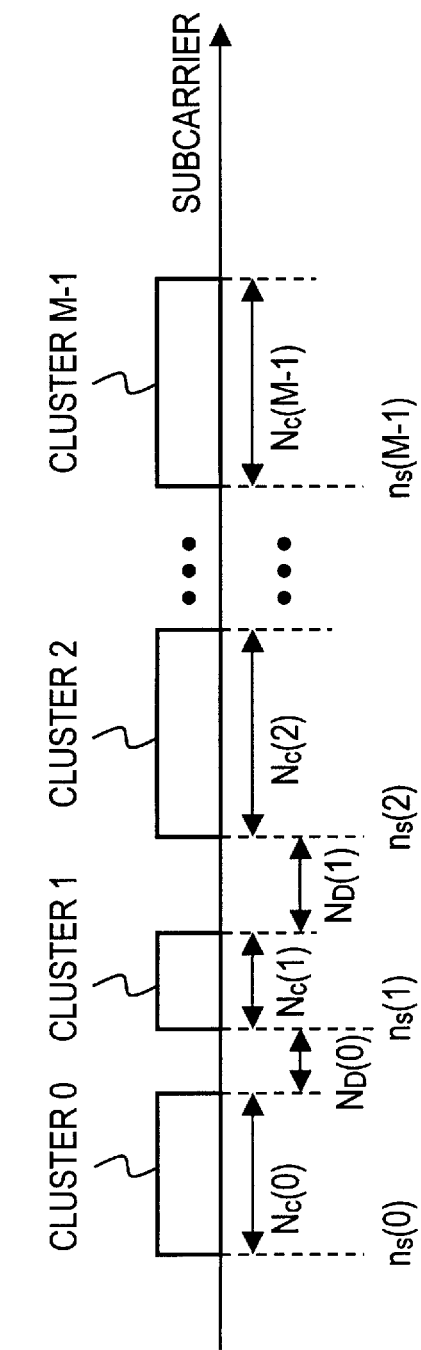
FIG. 6 illustrates an example of subcarrier arrangement.
Figure 7:
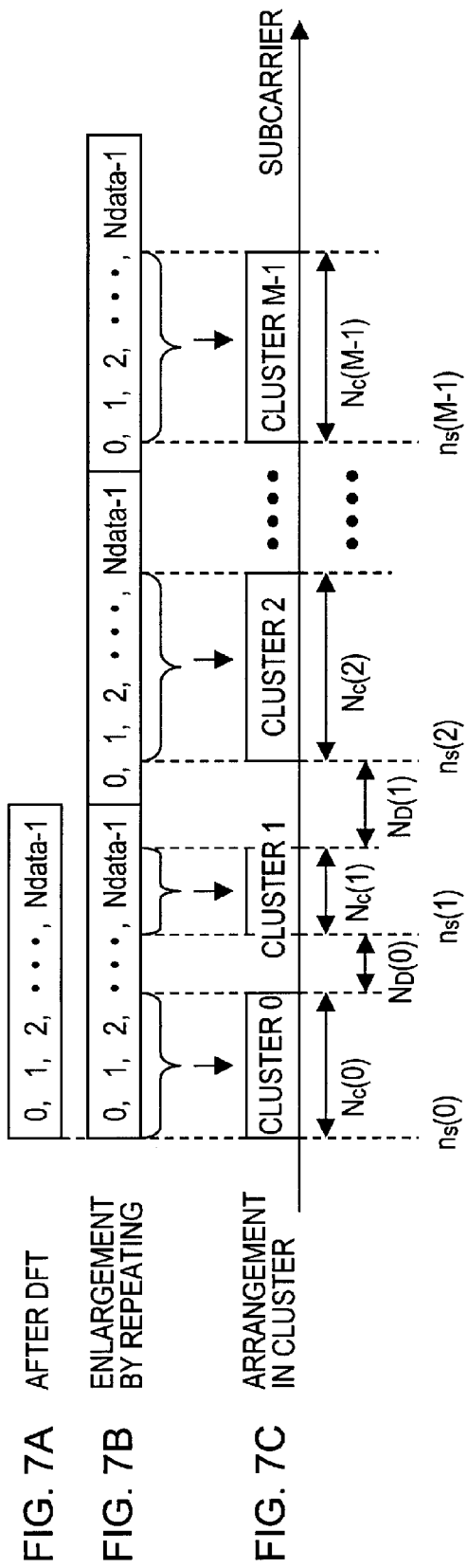

The subcarrier arrangement unit 104 sequentially arranges the data sequences after the repeating b0, b1, ..., b11, b0, b1, ... on the subcarriers in accordance with the transmission subcarrier arrangement information. The subcarrier arrangement unit 104 sequentially arranges the data sequences b0, b1, ..., b11, b0, b1, ... at the same subcarrier positions as those before cluster division. In other words, the subcarrier arrangement unit 104 arranges the data sequences b0, b1, ..., b11, b0, b1, ... on the subcarriers while maintaining a positional relationship between the data sequences after the repeating (or after DFT). In the examples of FIGS. 5B and 5C, the subcarrier arrangement unit 104 arranges the data sequences b0 to b7 on the subcarriers as a cluster 1, and arranges the data sequences b9 to b11 and b0 on the subcarriers as a cluster 2. The subcarrier arrangement unit 104 punctures the data sequence to be arranged on the subcarrier not used for transmission (b8 in the example of FIG. 5D) (arranges "0").

It is to be noted that there are cases where, when the subcarrier arrangement unit 104 sequentially arranges the data sequences on the subcarriers while maintaining the positional relationship therebetween, the subcarrier used for transmission become redundant due to the presence of the subcarrier not used for transmission, and the data sequence after DFT disadvantageously becomes deficient in number. In order to compensate for the lack of the data sequence, the sequence length enlargement unit 103 enlarges the data sequence after DFT.

When the output sequences after DFT b0, b1, ..., b11 are compared with the sequences after the subcarrier arrangement, eleven subcarriers of b0 to b7 and b9 to b11 are arranged at the same positions as those of the output sequences after DFT. In other words, eleven subcarriers are arranged according to the subcarrier arrangement identical with that in the case of a single carrier. With this, data sequences in which most components (eleven subcarriers) out of the total of twelve subcarriers become the same waveform components as those in the case of the single carrier (transmission sequences having a signal waveform which is less likely to change from the single carrier) are obtained.

In the example of FIG. 5A or the like, the data sequences after the subcarrier arrangement are different from the data sequences after DFT (or the data sequences before the cluster division) as a single-carrier signal by at most one subcarrier. Therefore, in the case of the present embodiment, a change in the PAPR characteristics is small as compared with the case of single-carrier transmission.

In addition, in the conventional embodiment using Clustered SC-FDMA (FIGS. 22A to 22C), four subcarriers are arranged at positions different from those of the data sequences after DFT (the data sequences of the single-carrier transmission). On the other hand, in the example of FIG. 5A or the like, the data sequences are different from the data sequences of the single-carrier transmission by one subcarrier. Therefore, properties in the case of the present embodiment are similar to those of the single-carrier transmission as compared with Clustered SC-FDMA, and hence the degradation in the PAPR characteristics can be suppressed.

Next, a description is given of an example of the subcarrier arrangement using a common example. FIG. 6 and FIGS. 7A to 7C illustrate examples of the arrangement in such a case.

It is assumed that the number of clusters k satisfies k=0, 1, ..., M−1, and in each cluster #k, $N_C(k)$ subcarriers are included. In addition, it is also assumed that $N_D(k)$ represents an interval between the cluster #k and the cluster #(k+1) (the number of subcarriers not used for transmission).

Herein, when it is assumed that $n_s(0)$ is the number of the subcarrier having the lowest frequency among the subcarriers used for transmission, the number of the subcarrier included in each cluster #k is represented by $$n_s(k) = n_s(0) + \sum_{l=0}^{k-1} N_C(l) + \sum_{l=0}^{k-1} N_D(l) \quad \text{[Expression 1]}$$

which results in $$n_s(k), n_s(k)+1, \ldots, n_s(k)+N_C(k)-1 \quad \text{[Expression 2]}$$

When it is assumed that $N_{data}$ represents the number of input data sequences to the DFT unit 102, in the case where the DFT unit 102 performs the DFT processing the number of times equal to the number of subcarriers in the cluster $N_C(k)$, $$N_{data} = \sum_{k=0}^{M-1} N_C(k) \quad \text{[Expression 3]}$$

is obtained.

The subcarrier arrangement unit 104 arranges $N_{data}$ DFT output y(i) on the individual $N_C(k)$ subcarriers in the cluster #k. That is, the subcarrier arrangement unit 104 arranges $$y(n_s(k) \bmod N_{data}), y((n_s(k)+1) \bmod N_{data}), \ldots, y((n_s(k)+N_C(k)) \bmod N_{data}) \quad \text{[Expression 4]}$$

on the individual subcarriers in the cluster #k. The mod operation of Expression 4 corresponds to repeat and enlargement processing in the sequence length enlargement unit 103.

Thus, in the second embodiment, the sequence length enlargement unit 103 performs the repeat and enlargement processing on the data sequences after DFT, and the subcarrier arrangement unit 104 sequentially arranges the data sequences on the subcarriers while maintaining the positional (or the arrangement) relationship between the data sequences after the enlargement processing (or the data sequences after DFT). At this point, the subcarrier arrangement unit 104 punctures the data to be arranged on the subcarrier not used for transmission.

In the present second embodiment, the arrangement onto the subcarriers is performed while the positional relationship between the data sequences is maintained so that the transmission waveform thereof becomes similar to that of the single-carrier transmission as compared with that of Clustered SC-FDMA, and the PAPR characteristics of the transmission apparatus 100 can be improved.

Next, a description is given of the point that, even when the data sequence after DFT is enlarged by the sequence length enlargement unit 103, the properties of the single-carrier transmission are maintained. The description is given by taking, as an example, the case where the DFT unit 102 performs the DFT conversion of the size of T on T input symbols, and the IFFT unit 105 performs the IDFT conversion at the size of 2T to generate a time waveform.

When the DFT conversion of the size of T is performed on T input symbols a(0) to a(T−1), an output sequence after DFT b(k) is represented by $$b(k) = \frac{1}{\sqrt{T}} \sum_{n=0}^{T-1} \exp(-2\pi jkn/T) a(n) \quad \text{[Expression 5]}$$

Consideration is given to the case where the output sequence b(k) is repeated by the repeat and enlargement processing, and the size is thereby set to 2T. When the IFFT conversion of the size of 2T is performed with the repeating of the output sequence b(k), an output waveform $\xi_2(t)$ from the IFFT unit 105 is represented by $$\xi_2(t) = \frac{1}{\sqrt{2T}} \sum_{k=0}^{2T-1} \exp(2\pi jtk/2T) b(k \bmod T) \quad \text{[Expression 6]}$$

On the other hand, when the enlargement processing is performed by adding T "0"s to the output sequence b(k) (the size is 2T), an output waveform $\xi_1(t)$ from the IFFT unit 105 is represented by $$\xi_1(t) = \frac{1}{\sqrt{2T}} \sum_{k=0}^{T-1} \exp(2\pi jtk/2T) b(k) \quad \text{[Expression 7]}$$

Consideration is given to the two output waveforms $\xi_1(t)$ and $\xi_2(t)$. First, for the output waveform $\xi_2(t)$, at a position of an even sample t=2n, $$\xi_2(2n) = \frac{1}{\sqrt{2T}} \sum_{k=0}^{2T-1} \exp(2\pi jnk/T) b(k \bmod T) = \frac{1}{\sqrt{2}} \left( \frac{1}{\sqrt{T}} \sum_{k=0}^{T-1} \exp(2\pi jnk/T) b(k \bmod T) + \frac{1}{\sqrt{T}} \sum_{k=T}^{2T-1} \exp(2\pi jnk/T) b(k \bmod T) \right) \quad \text{[Expression 8]}$$

is established. Herein, in the second term of the right side in the brackets of Expression 8, both of b(k mod T) and exp(2πjnk/T) serve as periodic functions of a period T. That is, $$b((k+T) \bmod T) = b(k)$$

$$\exp(2\pi jn(k+T)/T) = \exp(2\pi jnk/T) \quad \text{[Expression 9]}$$

are established and, in the case where k=0 to T−1 is satisfied, $$b(k \bmod T) = b(k) \quad \text{[Expression 10]}$$

is established, and therefore Expression 8 is transformed into $$\xi_2(2n) = \frac{1}{\sqrt{2}} \left( \frac{1}{\sqrt{T}} \sum_{k=0}^{T-1} \exp(2\pi jnk/T)b(k) + \right.$$
$$\left. \frac{1}{\sqrt{T}} \sum_{k=0}^{T-1} \exp(2\pi jnk/T)b(k) \right) =$$
$$\frac{2}{\sqrt{2}} \left( \frac{1}{\sqrt{T}} \sum_{k=0}^{T-1} \exp(2\pi jnk/T)b(k) \right) =$$
$$\frac{2}{\sqrt{2}} \sum_{k=0}^{T-1} IDFT(b(k)) = \sqrt{2}\, a(n)$$

[Expression 11]

For the output waveform $\xi_2(t)$, a value at the position of the even sample t=2n becomes the same value as that of an input signal a(n).

Next, for an odd sample t=2n+1 of the output waveform $\xi_2(t)$, from Expression 6, $$\xi_2(2n+1) = \frac{1}{\sqrt{2T}} \sum_{k=0}^{2T-1} \exp(2\pi j(2n+1)k/2T)b(k \bmod T) =$$
$$\frac{1}{\sqrt{2}} \left( \frac{1}{\sqrt{T}} \sum_{k=0}^{T-1} \exp(2\pi j(n+1/2)k/T)b(k \bmod T) + \right.$$
$$\left. \frac{1}{\sqrt{T}} \sum_{k=T}^{2T-1} \exp(2\pi j(n+1/2)k/T)b(k \bmod T) \right)$$

[Expression 12]

is established. In the second term of the right side of Expression 12, when k is replaced by k+T, and an addition interval [T, 2T−1] is replaced by [0, T−1], the second term of the right side results in $$\sum_{k=T}^{2T-1} \exp(2\pi j(n+1/2)k/T)b(k \bmod T) =$$
$$\sum_{k=0}^{T-1} \exp(2\pi j(n+1/2)(k+T)/T)b((k+T) \bmod T) =$$
$$\sum_{k=0}^{T-1} \exp(\pi j(k+T)/T)\exp(2\pi jnk/T)b(k) =$$
$$\sum_{k=0}^{T-1} \exp(\pi jk/T)\exp(\pi j)\exp(2\pi jnk/T)b(k) =$$
$$-\sum_{k=0}^{T-1} \exp(\pi jk/T)\exp(2\pi jnk/T)b(k)$$

[Expression 13]

When Expression 13 is substituted into Expression 12, Expression 12 results in $$\xi_2(2n+1) =$$
$$\frac{1}{\sqrt{2}} \frac{1}{\sqrt{T}} \sum_{k=0}^{T-1} (1-1)\exp(\pi jk/T)\exp(2\pi jnk/T)b(k) = 0$$

[Expression 14]

That is, the output waveform $\xi_2(t)$ outputted from the IFFT unit 105 resulting from performing the enlargement processing by repeatedly arranging b(k) in the frequency domain becomes a waveform in which the component is localized in the even sample, and becomes "0" in the odd sample in the time domain. Accordingly, the time waveform of the sequences enlarged by repeating the output sequences after DFT in the frequency domain becomes a waveform equal to that of the single-carrier transmission.

On the other hand, when the enlargement processing is performed by repeatedly arranging "0" in the frequency domain, the output waveform $\xi_1(t)$ outputted from the IFFT unit 105 becomes a waveform identical with a waveform obtained by causing the output waveform $\xi_2(t)$ to pass through a low-pass filter in the frequency domain. In this case, the output waveform $\xi_1(t)$ becomes a waveform generated by interpolating the value at the odd sample position t=2n+1 which is "0" on the subcarrier with the component of $\xi_2(t)$. Therefore, the output waveform of the sequences enlarged by repeatedly arranging "0" additionally in the output after DFT in the frequency domain becomes a waveform in which, without changing constellation points in the even samples, an interpolated sample point therebetween is reduced. Consequently, the output waveform $\xi_1(t)$ also becomes the waveform equal to the time waveform of the single-carrier transmission.

In view of the foregoing, even when the enlargement processing is performed, the output waveform maintains the waveform of the single-carrier transmission.

Next, an example of an operation of the second embodiment is described. First, the subcarrier arrangement determination unit 209 of the reception apparatus 200 determines the subcarrier arrangement for the data transmitted from the transmission apparatus 100. Subsequently, the transmission subcarrier arrangement information generation unit 210 generates the transmission subcarrier arrangement information based on the arrangement onto the subcarriers determined in the subcarrier arrangement determination unit 209. Thereafter, the transmission subcarrier arrangement information is transmitted from the transmission antenna 214 to the transmission apparatus 100 via the frame configuration unit 212 and the modulation unit 213.

Figure 8:
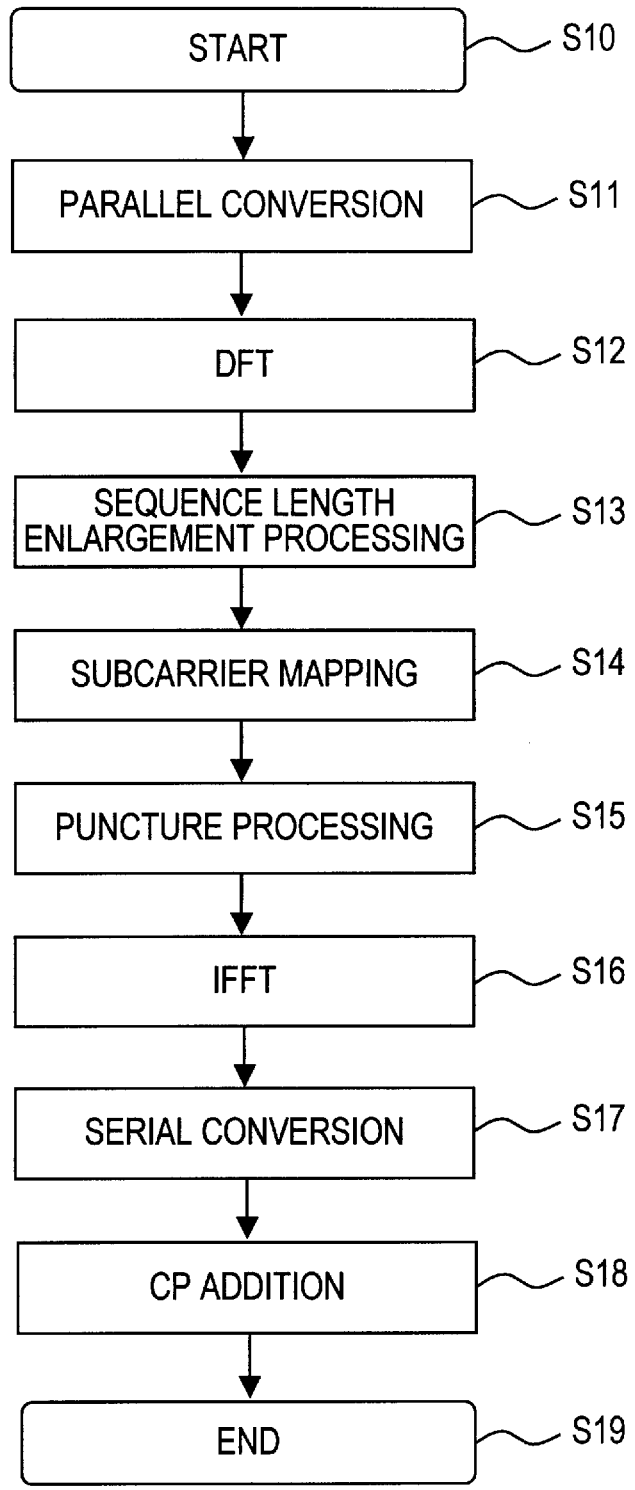
FIG. 8 is a flowchart illustrating an example of an operation.

FIG. 8 is a flowchart illustrating an example of an operation of the transmission apparatus 100. When processing is started (S10), the serial-parallel conversion unit 101 converts the format of input data (or transmission data or a transmission signal) into the parallel format (S11).

Next, based on the DFT size determined in the DFT size determination unit 112, the DFT unit 102 performs the DFT processing on the input data after the parallel conversion, and converts the input data into the data in the frequency domain b0, b1, ..., $b_{N-1}$ (S12).

Then, the sequence length enlargement unit 103 performs the enlargement processing on the data b0, b1, ..., $b_{N-1}$ based on the transmission subcarrier arrangement information transmitted from the reception apparatus 200 and the DFT size (S13).

Subsequently, the subcarrier arrangement unit 104 sequentially arranges the data sequences after the enlargement b0, b1, ..., $b_{N-1}$, b0, b1, ... on the subcarriers in a transmission frequency band (S14). Even when a discontinuous subcarrier not used for transmission is present, the subcarrier arrangement unit 104 maintains the arrangement relationship between the data sequences b0, b1, ..., $b_{N-1}$, b0, b1, ... as it is and, and sequentially arranges the data sequences on the subcarriers. The subcarrier arrangement unit 104 punctures the component of the data sequence in correspondence to the subcarrier not used for transmission.

Next, the IFFT unit 105 performs the IFFT processing on an output from the subcarrier arrangement unit 104 to convert the output into the data sequences in the time domain (S16).

Subsequently, the parallel-serial conversion unit 106 performs the serial conversion on the output of the IFFT unit 105 (S17), and the CP addition unit 107 adds CP to the converted output (S18). Then, a series of processing is ended (S19).

The reception apparatus 200 having received such data sequences operates in the following manner. That is, the CP removal unit 202 removes CP from the reception data received in the reception antenna 201, and the serial-parallel conversion unit 203 converts the format of the reception data after the CP removal into the parallel format. The reception data after the conversion is converted into the data in the frequency domain in the FFT unit 204. Thereafter, in accordance with the transmission subcarrier arrangement information generated in the transmission subcarrier arrangement information generation unit 210, the data sequences arranged on the subcarriers are extracted in the subcarrier extraction unit 205.

Thereafter, the extracted data sequences are reduced in sequence length in the sequence length reduction unit 206, and the same data as that after DFT in the transmission apparatus 100 $b0, b1, \ldots, b_{N-1}$ are obtained. Then, the data $b0, b1, \ldots, b_{N-1}$ are converted into the sequences in the time domain in the IDFT unit 207 and, after the sequences are subjected to the serial conversion in the parallel-serial conversion unit 208, the input data of the transmission apparatus 100 $a0, a1, \ldots, a_{N-1}$ are obtained.

Third Embodiment

Figure 9:
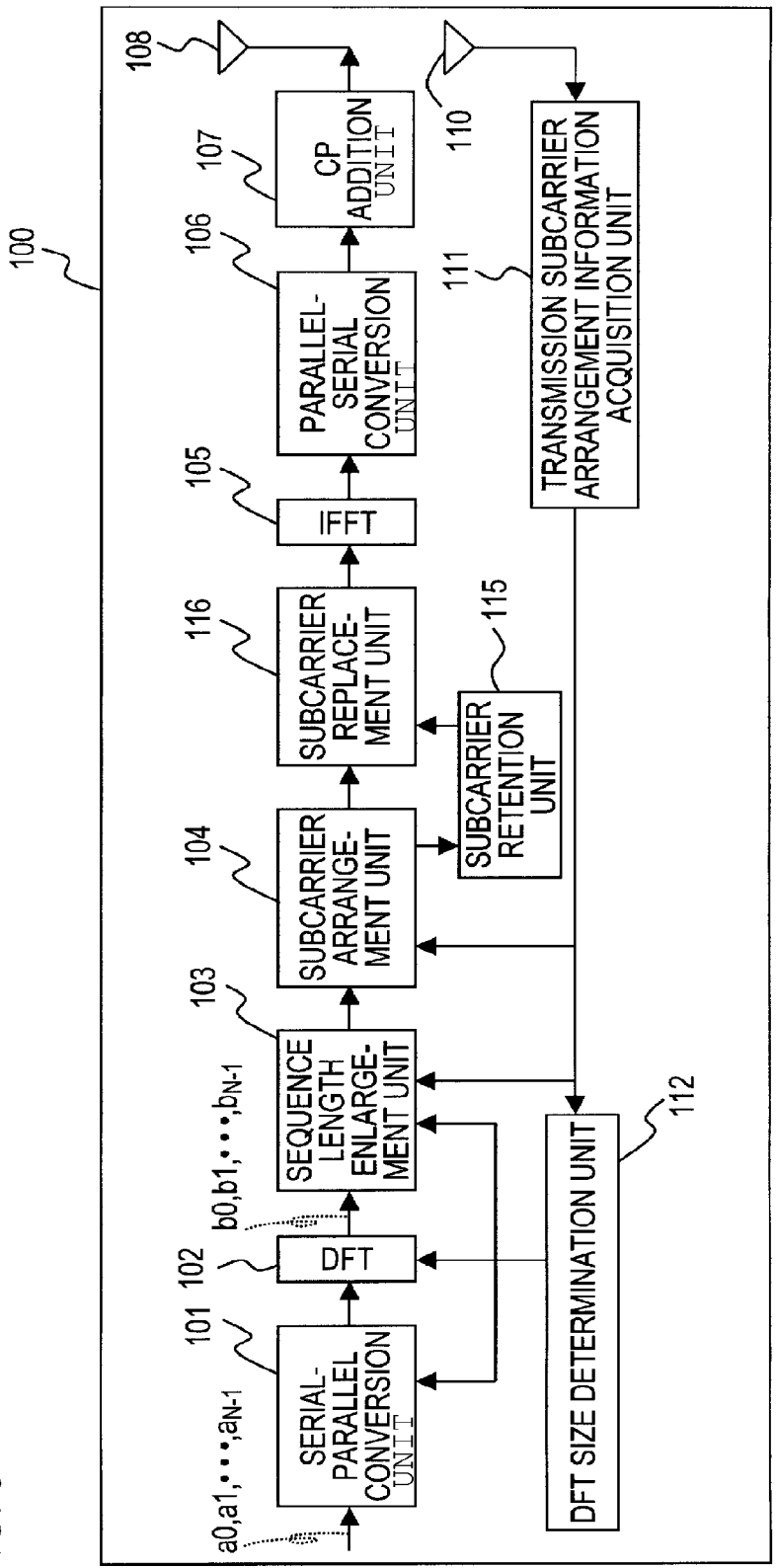
FIG. 9 illustrates an example of a configuration of the transmission apparatus.
Figure 10:
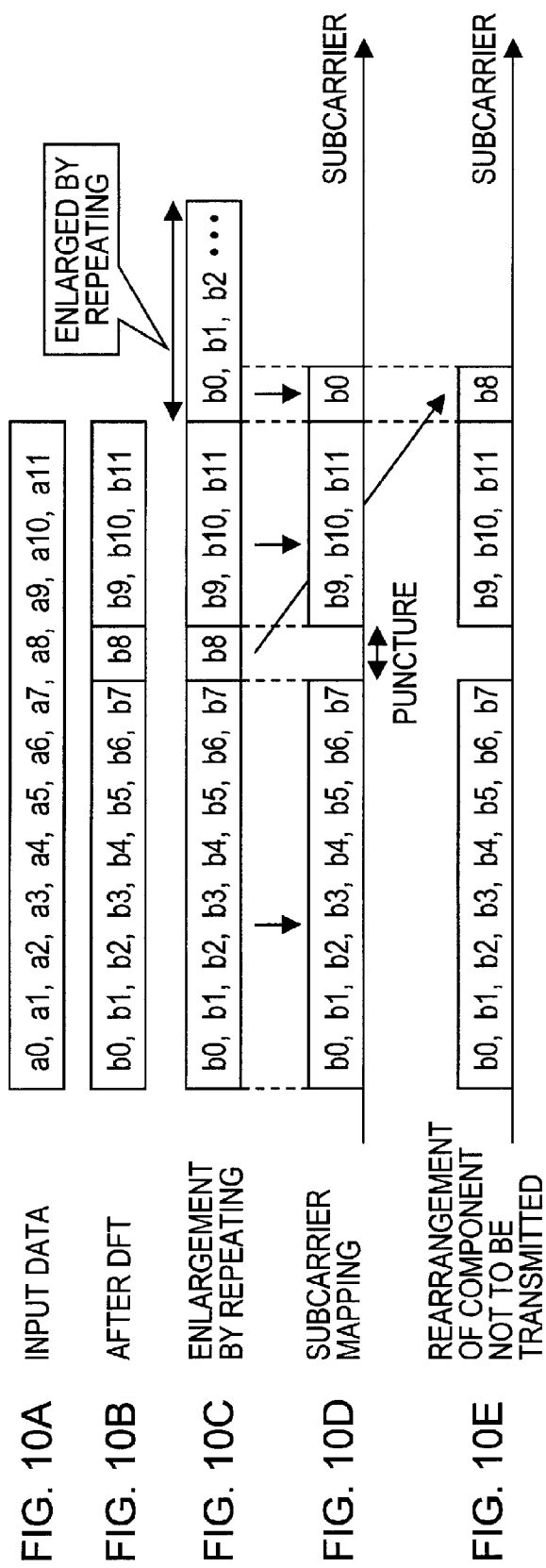

Next, a third embodiment is described. FIG. 9 illustrates an example of a configuration of the transmission apparatus 100 in the third embodiment. The reception apparatus 200 is the same as that in the second embodiment (see FIG. 3).

As illustrated in FIG. 9, the transmission apparatus 100 further includes a subcarrier retention unit 115 and a subcarrier replacement unit 116.

The subcarrier retention unit 115 retains the component of the data sequence punctured in the subcarrier arrangement unit 104 ("b8" in the example of FIG. 5C). For example, when performing puncture processing, the subcarrier arrangement unit 104 outputs the component to the subcarrier retention unit 115, and the component is thereby retained.

The subcarrier replacement unit 116 reads the punctured component from the subcarrier retention unit 115, and rearranges the component on the subcarrier. The rearrangement is performed by, for example, replacing, among the components of the data sequences arranged on the subcarriers, the component enlarged by repeating with the punctured component.

FIGS. 10A to 10E illustrate examples of the subcarrier arrangement. The examples illustrated in the drawings are examples each in which the component enlarged by repeating "b0" is replaced with the punctured component "b8".

In this manner, since the punctured component is transmitted to the reception apparatus 200 as the transmission data, the reception apparatus 200 can precisely reproduce the transmission data. In addition, also in the present third embodiment, the data is arranged on the subcarriers while the positional relationship between the data sequences after the sequence enlargement is maintained, similarly to the second embodiment. Therefore, the radio communication system 10 in the third embodiment is capable of improving PAPR.

Figure 11:
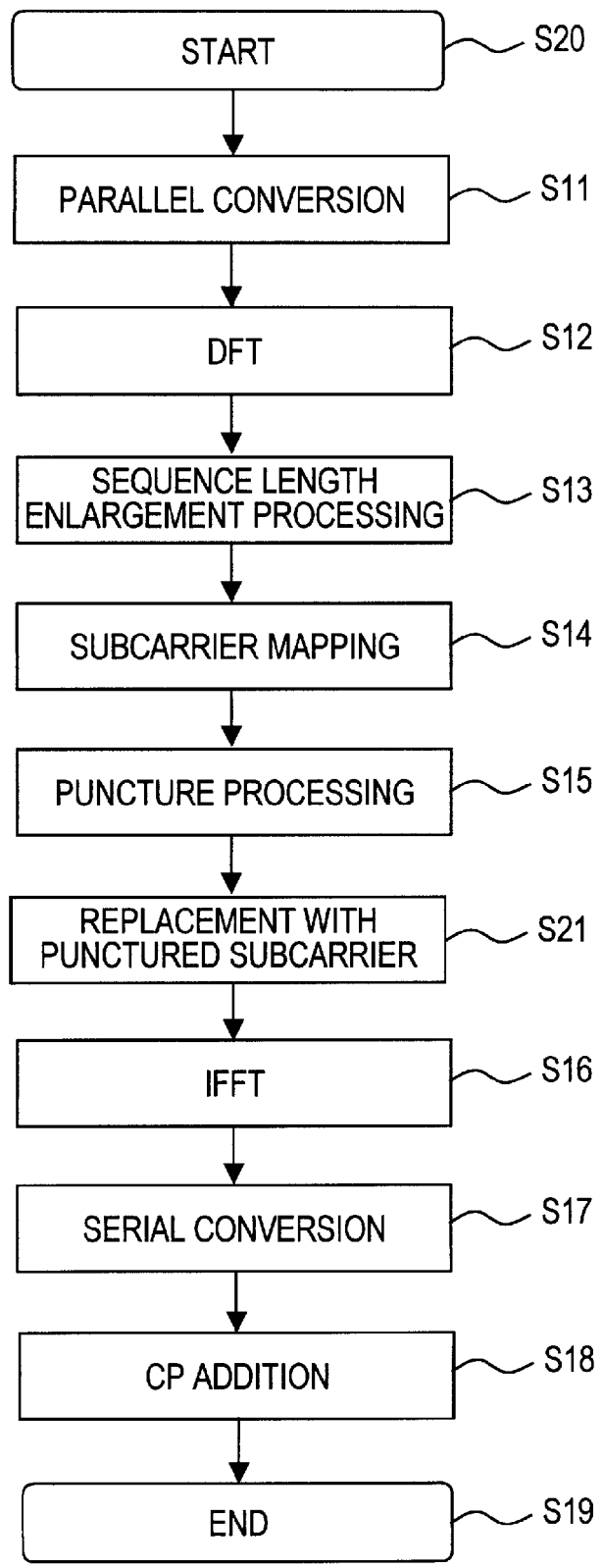
FIG. 11 is a flowchart illustrating an example of an operation.

FIG. 11 is a flowchart illustrating an example of processing in the transmission apparatus 100. After subcarrier mapping (S14), the subcarrier replacement unit 116 reads the punctured component from the subcarrier retention unit 115. Subsequently, the subcarrier replacement unit 116 replaces the component which is enlarged by repeating and arranged on the subcarrier with the punctured component (S21). The subsequent processing is the same as in the second embodiment.

Fourth Embodiment

Figure 12:
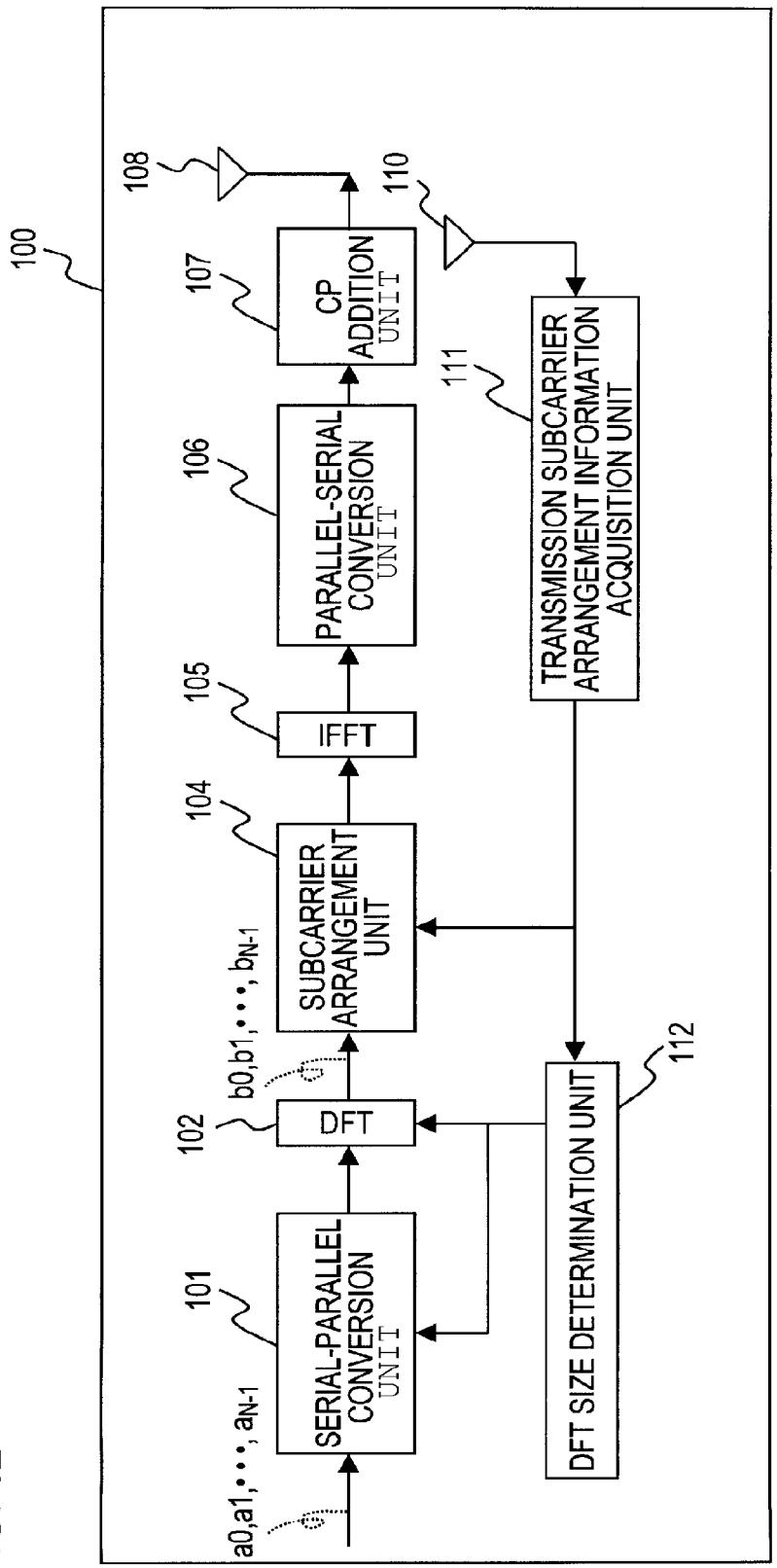
FIG. 12 illustrates an example of a configuration of the transmission apparatus.
Figure 13:
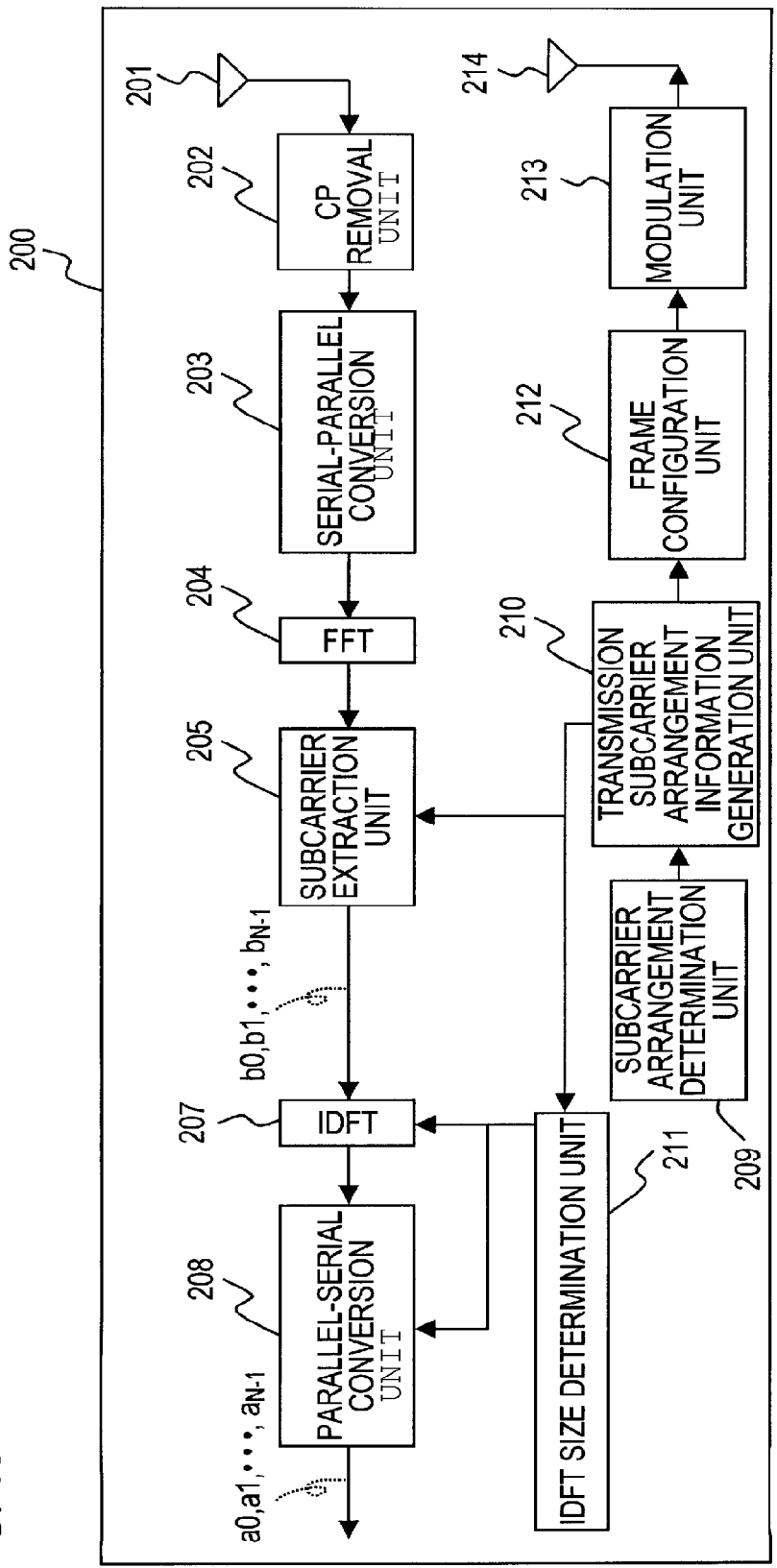
FIG. 13 illustrates an example of a configuration of the reception apparatus.

Next, a fourth embodiment is described. FIG. 12 illustrates an example of a configuration of the transmission apparatus 100, while FIG. 13 illustrates an example of a configuration of the reception apparatus 200.

The DFT size determination unit 112 of the transmission apparatus 100 determines, based on the subcarrier arrangement information, the number of subcarriers from the lowest subcarrier number to the highest subcarrier number as the DFT size. In this case, the number of subcarriers including the subcarrier to be punctured is determined as the DFT size.

Figure 14:
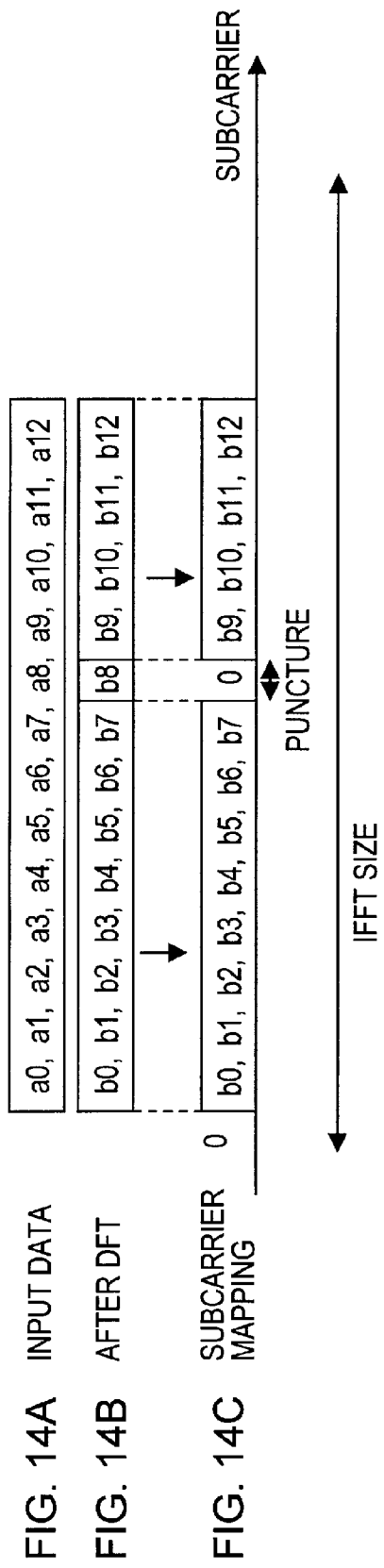

FIGS. 14A to 14C illustrate examples of the subcarrier arrangement and the like. In the case of the examples, the number of subcarriers used for transmission is "12", the number of subcarriers not used for transmission is "1", and therefore the DFT size is "13".

The DFT size determination unit 112 outputs information of "13" to the serial-parallel conversion unit 101 and the DFT unit 102. The serial-parallel conversion unit 101 outputs a parallel signal at intervals of "13" units. The DFT unit 102 outputs DFT output sequences b0 to b12 having a length of "13".

The subcarrier arrangement unit 104 arranges the output sequences b0 to b12 on the subcarriers. In the example illustrated in FIG. 14A, the subcarrier on which "b8" is to be arranged is not used for transmission, and hence the subcarrier arrangement unit 104 punctures the component "b8" (arranges "0"). The subsequent processing is the same as in the second embodiment.

The example of the subcarrier arrangement is described using a common example. Similarly to the second embodiment, it is assumed that each cluster #k (=0, 1, ..., M−1) has $N_C(k)$ subcarriers, and $N_D(k)$ (k=0 to M−2) represents an interval between the cluster #k and the cluster #(k+1) (the number of subcarriers not used for transmission). At this point, the subcarrier number included in the cluster #k is represented by $$n_s(k) = \sum_{l=0}^{k-1} N_C(l) + \sum_{l=0}^{k-1} N_D(l) \quad \text{[Expression 15]}$$

which results in $$n_s(k), n_s(k)+1, \ldots, n_s(k)+N_C(k)-1 \quad \text{[Expression 16]}$$

Since the number obtained by adding the number of subcarriers not used for transmission $N_D(k)$ and the number of subcarriers included in the cluster #k $N_C(k)$ serves as the DFT size, the number of input data items to the DFT unit 102 $N_{data}$ is represented by $$N_{data} = \sum_{k=0}^{M-1} N_C(k) + \sum_{k=0}^{M-2} N_D(k) \quad \text{[Expression 17]}$$

Then, the subcarrier arrangement unit 104 arranges $N_{data}$ DFT output y(i) on the subcarriers of each cluster. That is, the subcarrier arrangement unit 104 arranges $$y(n_s(k)), y((n_s(k)+1)), \ldots, y(n_s(k)+N_C(k)) \quad \text{[Expression 18]}$$

on $N_C(k)$ subcarriers of the cluster #k.

Figure 15:
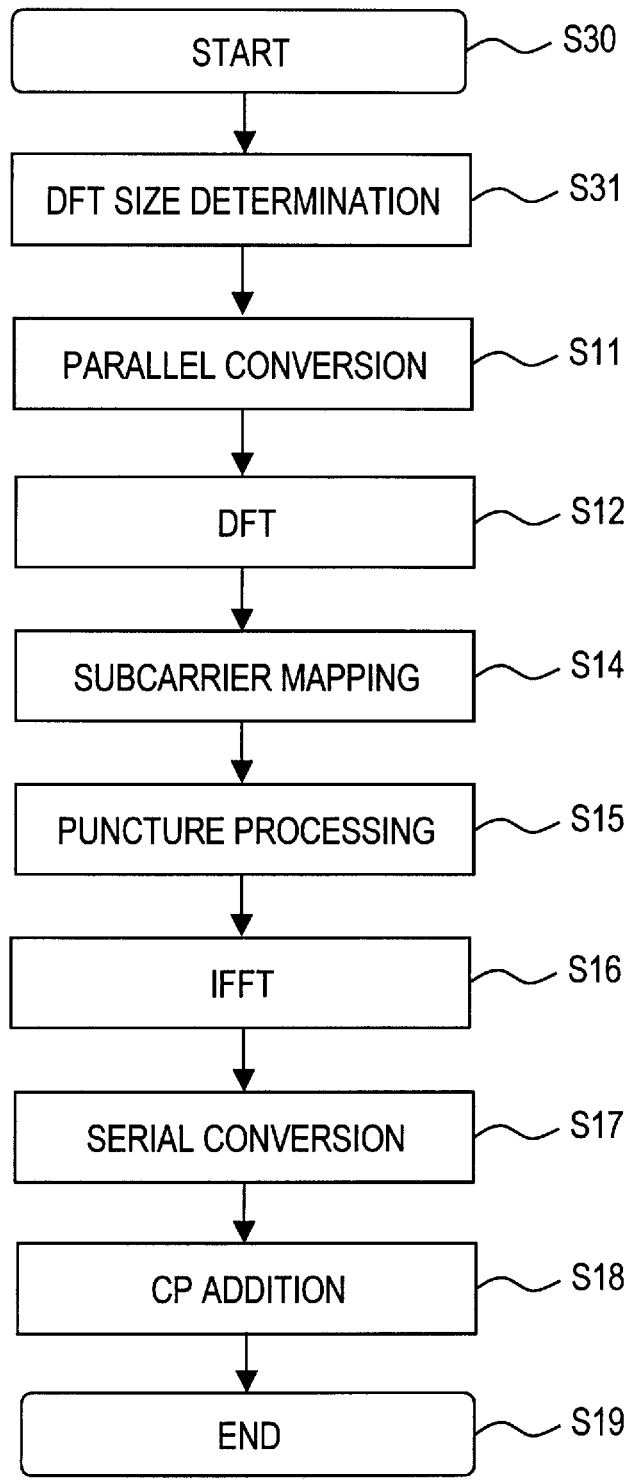
FIG. 15 is a flowchart illustrating an example of an operation.

FIG. 15 is a flowchart illustrating an example of processing. In the DFT processing, the DFT size larger than the number of subcarriers allocated for transmission is determined in the DFT size determination unit 112. For example, as described above, the DFT size determination unit 112 determines the number obtained by adding the number of subcarriers used for transmission and the number of subcarriers not used for transmission as the DFT size. The DFT unit 102 performs the DFT processing at the determined DFT size (S31). The subsequent processing is the same as in the second embodiment.

The fourth embodiment does not include the repeat and enlargement processing, and hence the transmission apparatus 100 does not have the sequence length enlargement unit 103, and the reception apparatus 200 does not have the sequence length reduction unit 206 so that the number of parts of each of the apparatuses is reduced, and the design thereof becomes easy as compared with the second embodiment.

It is to be noted that the present fourth embodiment is also applicable in the third embodiment described above. The data after the DFT processing is transmitted to the reception apparatus 200 as the transmission data after the subcarrier is replaced in the subcarrier replacement unit 116.

Fifth Embodiment

Next, a fifth embodiment is described. It is known that the multi-carrier transmission such as OFDM or the like has large PAPR, but is excellent in reception performance in a frequency selective fading environment as compared with the single-carrier transmission scheme. The PAPR characteristics are dependent on the arrangement of allocated subcarriers (the number of clusters, the sizes thereof, and the arrangement thereof). In particular, when the number of subcarriers to be punctured is larger than the number of subcarriers to be used for transmission, PAPR tends to be large. To cope with that, in the fifth embodiment, under given conditions, the transmission scheme is switched from the transmission scheme described in the second embodiment to OFDM (or the other way around).

Figure 16:
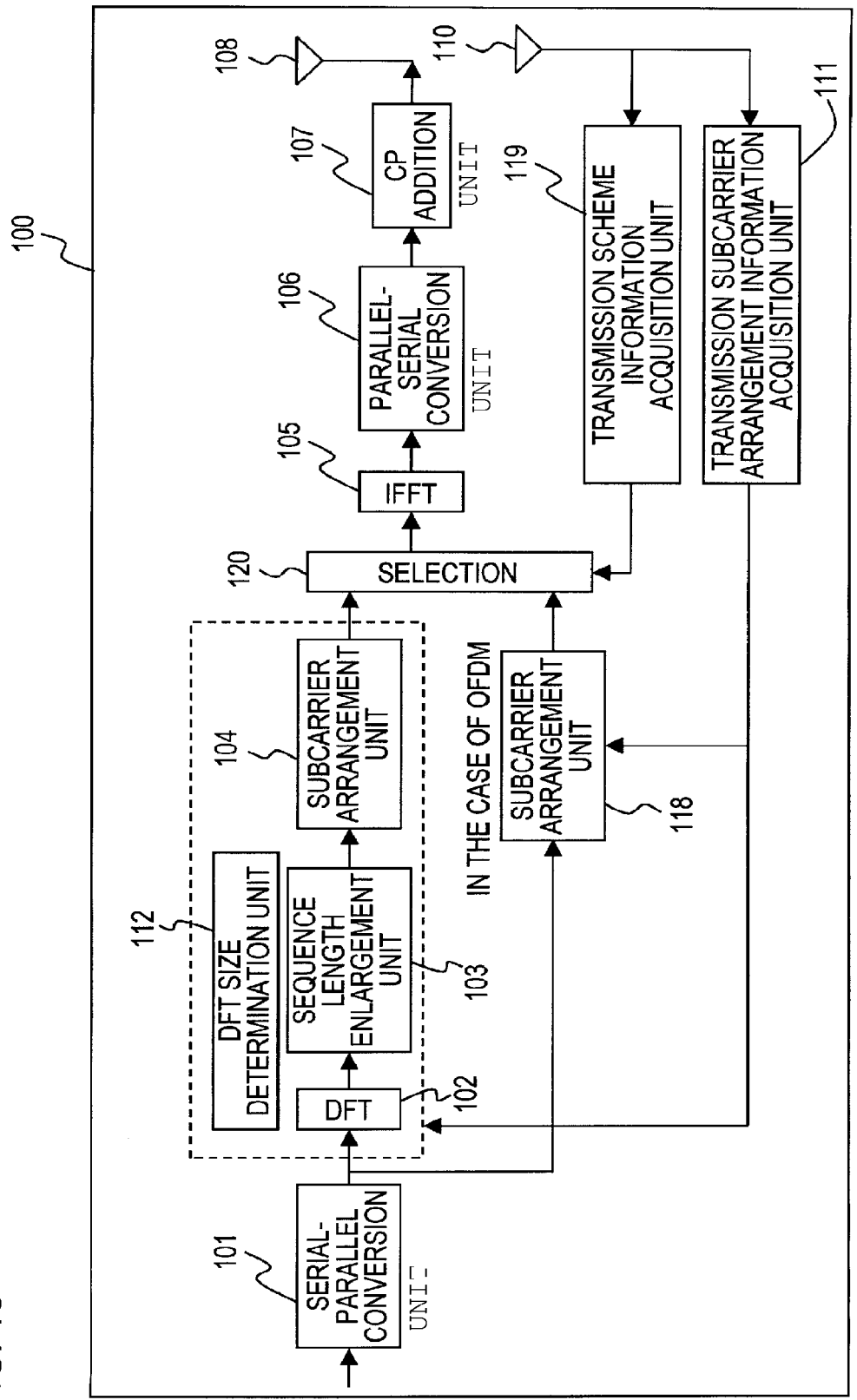
FIG. 16 illustrates an example of a configuration of the transmission apparatus.
Figure 17:
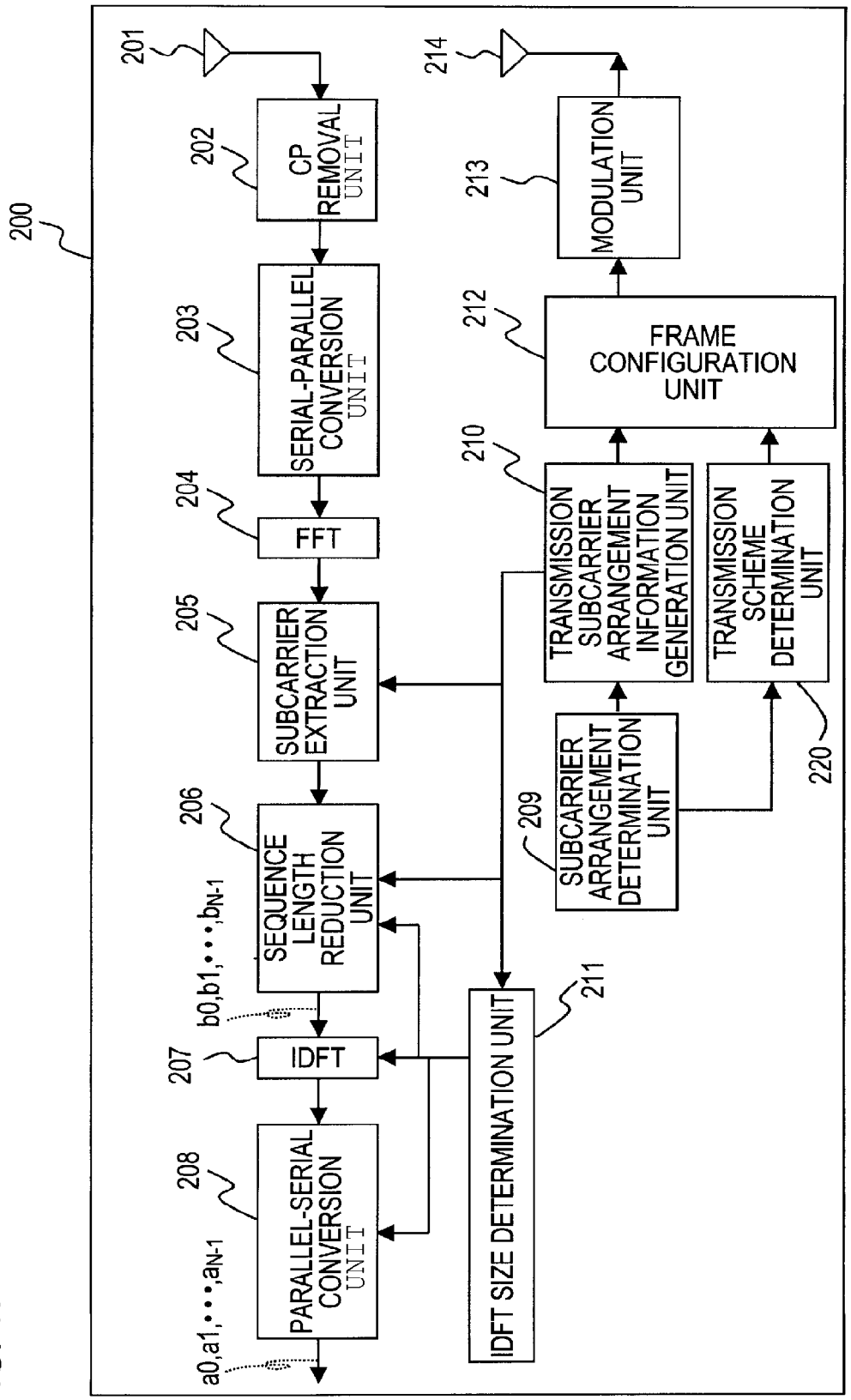
FIG. 17 illustrates an example of a configuration of the reception apparatus.

FIG. 16 illustrates an example of a configuration of the transmission apparatus 100, while FIG. 17 illustrates an example of a configuration of the reception apparatus 200. The transmission apparatus 100 further includes an OFDM subcarrier arrangement unit 118, a transmission scheme information acquisition unit 119, and a selection unit 120. In addition, the reception apparatus 200 further includes a transmission scheme determination unit 220.

The transmission scheme determination unit 220 determines the transmission scheme based on the subcarrier arrangement determined in the subcarrier arrangement determination unit 209. For example, when it is assumed that the number of subcarriers to be used for transmission is represented by A, and the number of subcarriers to be punctured is represented by B, the transmission scheme determination unit 220 selects the transmission scheme of the second embodiment when $B/A \leq X$ (X is a threshold) is satisfied, and selects OFDM when $B/A > X$ is satisfied. The determined transmission scheme is transmitted to the transmission apparatus 100 via the frame configuration unit 212 and the like as transmission scheme information.

The transmission scheme information acquisition unit 119 acquires the transmission scheme information, and outputs the transmission scheme information to the selection unit 120.

The OFDM subcarrier arrangement unit 118 arranges the input data after the parallel conversion on the subcarriers in accordance with the transmission subcarrier arrangement information.

When the transmission scheme information indicates the transmission scheme of the second embodiment, the selection unit 120 selects the output of the subcarrier arrangement unit 104 and, when the transmission scheme information indicates OFDM, the selection unit 120 selects an output from the OFDM subcarrier arrangement unit 118, and outputs it. The subsequent processing is the same as in the second embodiment.

Figure 18B:
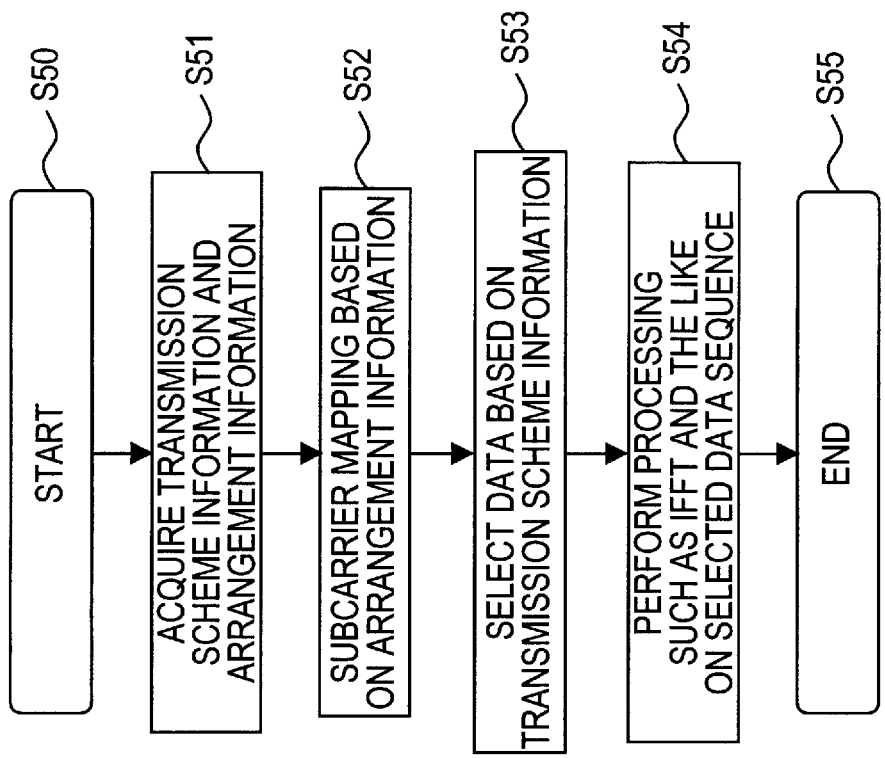
FIGS. 18A and 18B are flowcharts each illustrating an example of an operation.
Figure 18A:
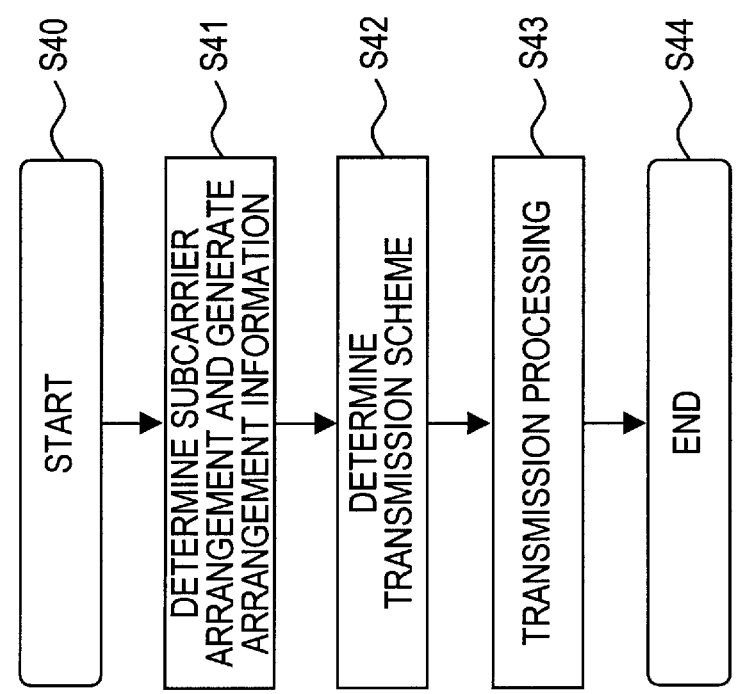

FIG. 18A is a flowchart illustrating an example of an operation of the reception apparatus 200, while FIG. 18B is a flowchart illustrating an example of an operation of the transmission apparatus 100.

The subcarrier arrangement determination unit 209 of the reception apparatus 200 determines the subcarrier arrangement for the transmission apparatus 100, and the transmission subcarrier arrangement information generation unit 210 generates the transmission subcarrier arrangement information based on the determined arrangement (S41). The transmission scheme determination unit 220 determines the transmission scheme (S42). Two information items of the transmission scheme information and the transmission subcarrier arrangement information are transmitted to the transmission apparatus 100 (S43 to S44). The two information items are transmitted as, for example, control information.

On the other hand, the transmission scheme information acquisition unit 119 of the transmission apparatus 100 acquires the transmission scheme information, and the transmission subcarrier arrangement information acquisition unit 111 acquires the transmission subcarrier arrangement information (S51). Each of the subcarrier arrangement unit 104 and the OFDM subcarrier arrangement unit 118 arranges the data sequences on the subcarriers (S52), and the selection unit 120 selects one of the data sequences in accordance with the transmission scheme information (S53). Thereafter, processing such as IFFT or the like is performed on the selected data, and the data is transmitted to the reception apparatus 200 (S54 to S55).

It is to be noted that, in the present fifth embodiment, since it is sufficient to switch to other scheme such as the multi-carrier transmission and the like, the scheme may be switched to OFDMA, Clustered SC-OFDM, or the like other than OFDM. In this case, the OFDM subcarrier arrangement unit 118 performs the arrangement onto the subcarriers based on the individual scheme.

In addition, the present fifth embodiment is also applicable in the third and fourth embodiments. In the reception apparatus 100, it is also possible to cause the output of the subcarrier replacement unit 116 to be outputted to the selection unit 120. Further, in the transmission apparatus 100, it is also possible to set the DFT size of the DFT unit 102 to the number of subcarriers allocated to the transmission apparatus 100 or more, and cause the output of the DFT unit 102 to be directly outputted to the subcarrier arrangement unit 104.

Sixth Embodiment

Figure 19:
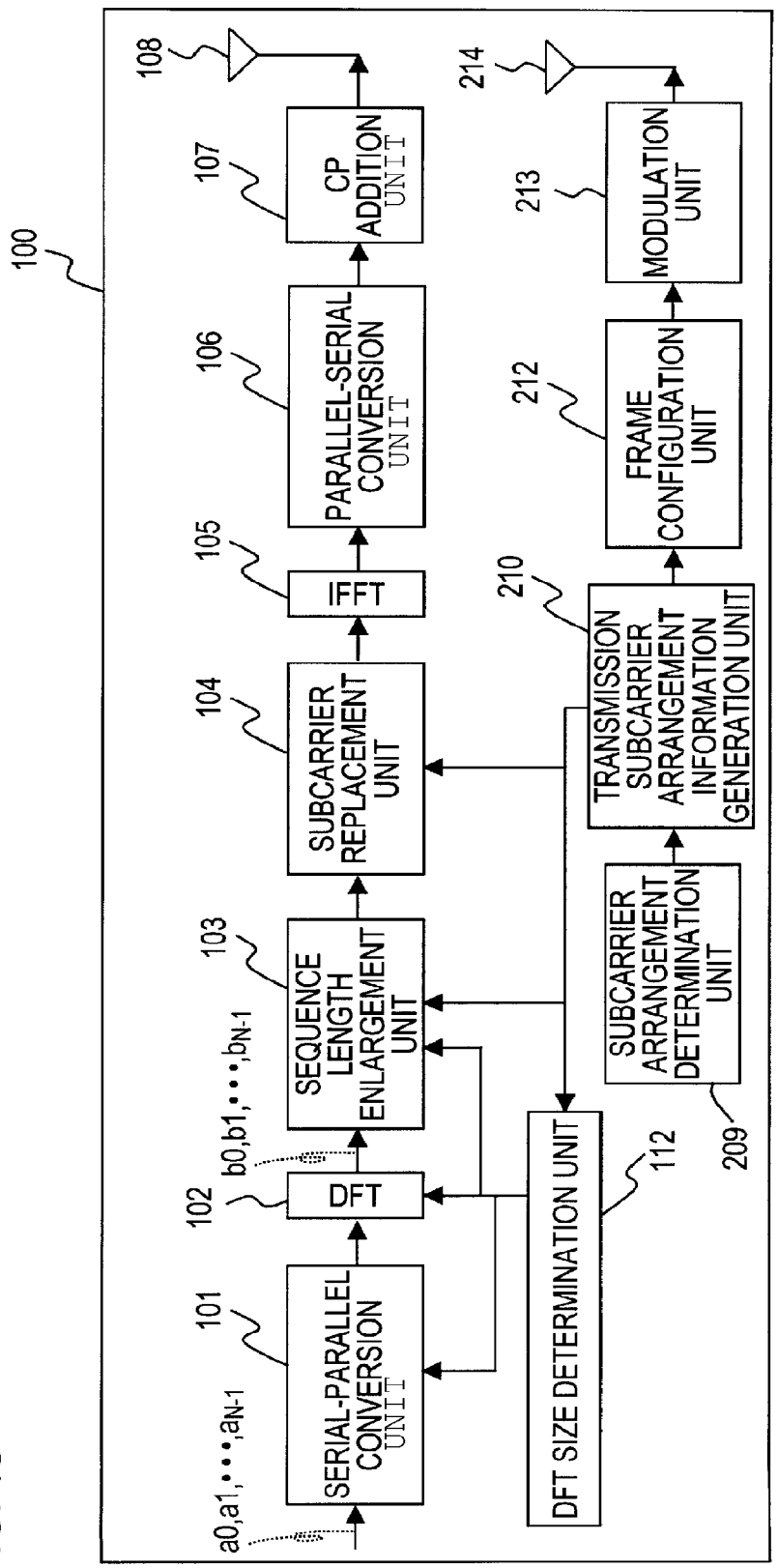
FIG. 19 illustrates an example of a configuration of the transmission apparatus.
Figure 20:
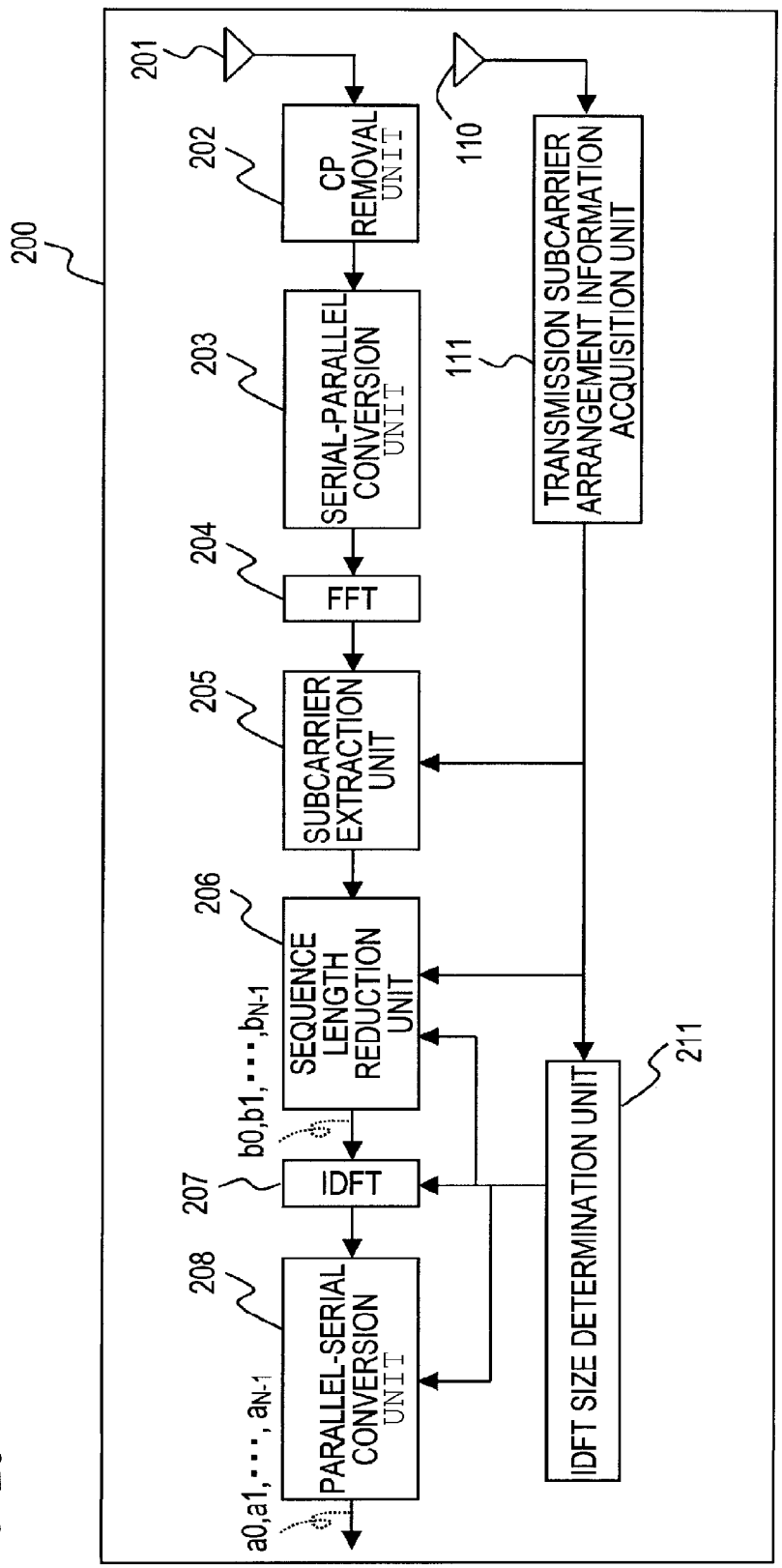
FIG. 20 illustrates an example of a configuration of the reception apparatus.

A sixth embodiment is an embodiment in a downlink direction. FIG. 19 illustrates an example of a configuration of the transmission apparatus 100, while FIG. 20 illustrates an example of a configuration of the reception apparatus 200. In the case of the present sixth embodiment, the transmission apparatus 100 serves as the base station apparatus, and the reception apparatus 200 serves as the terminal apparatus.

The transmission apparatus 100 in the sixth embodiment further includes the subcarrier arrangement determination unit 209, the transmission subcarrier arrangement information generation unit 210, the frame configuration unit 212, the modulation unit 213, and the transmission antenna 214.

The subcarrier arrangement determination unit 209 determines the arrangement of the transmission subcarrier for the reception apparatus 200.

The transmission subcarrier arrangement information generation unit 210 generates the transmission subcarrier arrangement information based on the determined subcarrier arrangement. The transmission subcarrier arrangement information is outputted to the sequence length enlargement unit 103, the subcarrier arrangement unit 104, and the DFT size determination unit 112.

The sequence length enlargement unit 103 performs the repeat and enlargement processing based on the transmission subcarrier arrangement information and the DFT size, similarly to the second embodiment. In addition, the subcarrier arrangement unit 104 sequentially arranges the output sequences on the subcarriers based on the transmission subcarrier arrangement information while maintaining the positional relationship between the output sequences, and punctures the subcarrier not used for transmission.

The generated transmission subcarrier arrangement information is transmitted from the transmission antenna 214 to the reception apparatus 200 via the frame configuration unit 212 and the modulation unit 213. The reception apparatus 200 receives the data in the downlink direction based on the transmission subcarrier arrangement information.

The reception apparatus 200 includes the transmission subcarrier arrangement information acquisition unit 111. The transmission subcarrier arrangement information acquisition unit 111 outputs the acquired transmission subcarrier arrangement information to the subcarrier extraction unit 205, the sequence length reduction unit 206, and the IDFT size determination unit 211.

The subcarrier extraction unit 205 extracts the data arranged on the subcarriers based on the transmission subcarrier arrangement information. In addition, the sequence length reduction unit 206 reduces the sequence length enlarged in the transmission apparatus 100 based on the transmission subcarrier arrangement information and the IDFT size. The subsequent processing is the same as in the second embodiment.

In the case of the downlink direction as well, when the transmission data sequences are arranged on the subcarriers, the arrangement is performed while the positional relationship between the transmission data sequences is maintained so that the transmission waveform is equal to the signal waveform in the single-carrier transmission, similarly to the second embodiment. In addition, even when the data sequence after DFT is enlarged by the sequence length enlargement unit 103, similarly to the second embodiment, the properties of the single-carrier transmission are maintained. Consequently, in the case of the downlink direction as well, the PAPR characteristics are improved as compared with Clustered SC-FDMA.

In the case of the downlink direction as well, it is possible to replace the enlarged component among the components of the data sequences arranged on the subcarriers with the punctured component (see the third embodiment), and also increase the DFT size to be larger than the number of subcarriers allocated for transmission (see the fourth embodiment). In the case of the latter, it is also possible to adopt a configuration in which the transmission apparatus 100 does not have the sequence length enlargement unit 103, and the reception apparatus 200 does not have the sequence length reduction unit 206. Further, in the case of the downlink direction as well, when the number of subcarriers to be punctured and the number of subcarriers to be used for transmission are given numbers, the switching between OFDM and the transmission scheme of the second embodiment may be performed (see the fifth embodiment).

<Simulation Result>

Figure 21:
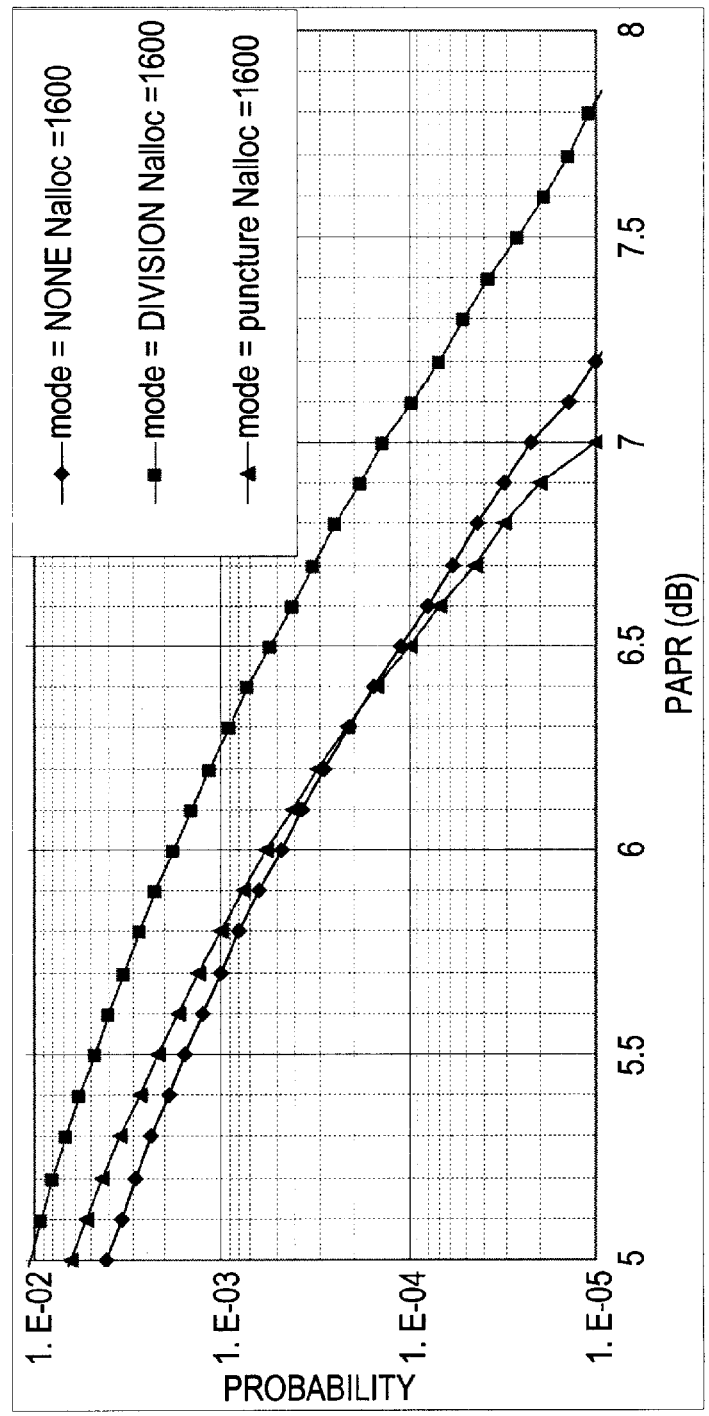
FIG. 21 illustrates an example of a simulation result.

Lastly, a simulation result in the second embodiment is described. FIG. 21 illustrates an example of the simulation result. The horizontal axis indicates PAPR, while the vertical axis indicates the probability that, in samples of the transmission signal waveform, PAPR becomes not more than a value on the horizontal axis. "mode=none" indicates the case where transmission is performed by using continuous Nalloc (=1600) subcarriers (the single-carrier transmission), "mode=division" indicates the case where transmission is performed using Clustered SC-FDMA, and "mode=puncture" indicates the case where transmission is performed according to the second embodiment.

As illustrated in FIG. 21, PAPR in the transmission scheme of the second embodiment is hardly different from that in the single-carrier transmission. In addition, PAPR in the transmission scheme of the second embodiment is low as compared with that in Clustered SC-FDMA. In view of the foregoing, the data transmission of the second embodiment is capable of improving PAPR.

As illustrated in FIG. 21, PAPR in the transmission scheme of the second embodiment is hardly different from that in the single-carrier transmission. In addition, PAPR in the transmission scheme of the second embodiment is low as compared with that in Clustered SC-ODMA. In view of the foregoing, the data transmission of the second embodiment is capable of improving PAPR.

Another Embodiment

In the second embodiment and the like, the sequence length enlargement unit 103 is enlarged the sequence length by repeatedly arranging the data sequences b0, b1, . . . , $b_{N-1}$ (for example, see FIG. 5C). The sequence length enlargement unit 103 may enlarge the data sequences b0, b1, . . . , $b_{N-1}$ by repeatedly arranging "0".

The invention claimed is:

1. A radio communication system, comprising:
a transmission apparatus; and
a reception apparatus, which communicates with the transmission apparatus, wherein
the transmission apparatus includes:
one or more processor configured to enlarge a length of a data sequence in a transmission data by repeating the data sequence in the transmission data, and to perform a first subcarrier arrangement to arrange each of components included in the enlarged data sequence to each of subcarrier while a position relationship between data sequences is maintained after the data sequence is enlarged, and to puncture the component of the arranged transmission data, when the subcarrier is not used for transmission; and
a transmitter which transmits the transmission data arranged on the subcarrier to the reception apparatus, and the reception apparatus includes a receiver which receives the transmission data.

2. The radio communication system according to claim 1, wherein the one or more processors are configured to arrange the each of components included in the enlarged transmission data to the each of subcarriers so as to maintain a positional relationship between the each of components in the enlarged transmission data.

3. The radio communication system according to claim 1, wherein the one or more processors are further configured to replace the component of the transmission data enlarged by repeating and arranged to the subcarrier with the punctured component of the transmission data, and to arrange the punctured component on the subcarrier.

4. A radio communication system, comprising:
a transmission apparatus; and
a reception apparatus, wherein the transmission apparatus and reception apparatus performs a radio communication, which communicates with the transmission apparatus, wherein
the transmission apparatus includes:
one or more processor configured to enlarge a sequence length of a transmission data by repeating a data sequence in the transmission data, and to perform a first subcarrier arrangement to arrange each of components included in the enlarged transmission data to each of subcarrier according to positions of the each of components in the enlarged transmission data, and to puncture the component of the arranged transmission data, when the subcarrier is not used for transmission; and
a transmitter which transmits the transmission data arranged on the subcarrier to the reception apparatus, and
the reception apparatus includes a receiver which receives the transmission data,
wherein the one or more processors are further configured to perform a second subcarrier arrangement to arrange the transmission data to the subcarriers based on first communication scheme, and to select one of the arranged transmission data arranged by the first or second subcarrier arrangement based on the number of the subcarriers used for transmission and the number of the subcarriers not used for transmission.

5. The radio communication system according to claim 4, wherein the one or more processor select one of the arranged transmission data arranged by the first or second subcarrier arrangement based on a result of comparison between a ratio of the number of the subcarriers used for transmission to the number of the subcarriers not used for transmission and a threshold.

6. A transmission apparatus for performing a radio communication with a reception apparatus, the apparatus comprising:
one or more processor configured to enlarge a length of a data sequence in a transmission data by repeating the data sequence in the transmission data, and to perform a subcarrier arrangement to arrange each of components included in the enlarged data sequence to each of subcarrier while a position relationship between data sequences is maintained after the data sequence is enlarged, and to puncture the component of the arranged transmission data, when the subcarrier is not used for transmission; and
a transmitter which transmits the arranged transmission data to the reception apparatus.

7. A radio communication method in a radio communication system for performing a radio communication between a transmission apparatus and a reception apparatus, the method comprising:
enlarging a length of a data sequence in a transmission data by repeating the data sequence in the transmission data, arranging each of components included in the enlarged data sequence to each of subcarrier while a position relationship between data sequences is maintained after the data sequence is enlarged, and puncturing the component of the arranged transmission when the subcarrier is not used for transmission, by the transmission apparatus;
transmitting the arranged transmission data to the reception apparatus, by the transmission apparatus; and
receiving the transmission data, by the reception apparatus.

* * * * *

UNITED STATES PATENT AND TRADEMARK OFFICE
CERTIFICATE OF CORRECTION

PATENT NO. : 8,711,972 B2  
APPLICATION NO. : 13/237466  
DATED : April 29, 2014  
INVENTOR(S) : Takashi Dateki et al.

It is certified that error appears in the above-identified patent and that said Letters Patent is hereby corrected as shown below:

On the Title Page, Item (54) and in the Specification, Column 1, lines 1-5, Invention title to be corrected from "RADIO COMMUNICATION SYSTEM, TRANSMISSION APPARATUS, RECEPTION APPARATUS, AND RADIO COMMUNICATION METHOD IN RADIO COMMUNICATION" to "RADIO COMMUNICATION SYSTEM, TRANSMISSION APPARATUS, RECEPTION APPARATUS, AND RADIO COMMUNICATION METHOD IN RADIO COMMUNICATION SYSTEM".

Signed and Sealed this  
First Day of July, 2014

Michelle K. Lee  
*Deputy Director of the United States Patent and Trademark Office*